(12) United States Patent
Utkovski et al.

(10) Patent No.: US 12,432,785 B2
(45) Date of Patent: Sep. 30, 2025

(54) DATA-CENTRIC EVENT-BASED RANDOM ACCESS PROCEDURE

(71) Applicant: KONINKLIJKE PHILIPS N.V., Eindhoven (NL)

(72) Inventors: Zoran Utkovski, Berlin (DE); Johannes Dommel, Berlin (DE); Thomas Haustein, Berlin (DE); Lars Thiele, Berlin (DE); Thomas Fehrenbach, Berlin (DE); Baris Göktepe, Berlin (DE); Cornelius Hellge, Berlin (DE); Thomas Schierl, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 573 days.

(21) Appl. No.: 17/552,993

(22) Filed: Dec. 16, 2021

(65) Prior Publication Data
US 2022/0110169 A1 Apr. 7, 2022

Related U.S. Application Data

(63) Continuation of application No. PCT/EP2020/066956, filed on Jun. 18, 2020.

(30) Foreign Application Priority Data

Jun. 19, 2019 (EP) .................................... 19181355

(51) Int. Cl.
H04W 74/0833 (2024.01)
H04W 72/0446 (2023.01)
(Continued)

(52) U.S. Cl.
CPC .... *H04W 74/0841* (2013.01); *H04W 72/0446* (2013.01); *H04W 72/1263* (2013.01); *H04W 74/0866* (2013.01)

(58) Field of Classification Search
CPC ......... H04W 74/0841; H04W 72/0446; H04W 72/1263; H04W 74/0866
See application file for complete search history.

(56) References Cited

U.S. PATENT DOCUMENTS 8,989,113 B2  3/2015 Mukherjee et al.
9,538,553 B2  1/2017 Yoshizawa
(Continued)

FOREIGN PATENT DOCUMENTS

CN  101820690 A  * 9/2010  ............. H04B 7/155
EP  1 916 863 A2  4/2008
(Continued)

OTHER PUBLICATIONS

International Search Report and Written Opinion issued in application No. PCT/EP2020/066956.
(Continued)

*Primary Examiner* — Duc C Ho

(57) ABSTRACT

A device for communicating in a wireless communication network to transmit transmission information by transmitting a wireless signal in a random access channel of wireless communication network includes a wireless interface configured for transmitting the wireless signal and a control unit configured for providing the wireless signals so as to include a random access preamble. The control unit is configured for selecting the random access preamble/that the random access preamble is associated with the transmission information.

27 Claims, 23 Drawing Sheets

(51) Int. Cl.
*H04W 72/1263* (2023.01)
*H04W 74/08* (2009.01)

(56) References Cited

U.S. PATENT DOCUMENTS

| | | | |
|---|---|---|---|
| 10,165,550 B2 | 12/2018 | Webb et al. | |
| 10,873,975 B2 | 12/2020 | Freda et al. | |
| 2005/0014508 A1 | 1/2005 | Moulsley et al. | |
| 2009/0191875 A1* | 7/2009 | Vujcic | H04W 74/004 455/436 |
| 2011/0249641 A1* | 10/2011 | Kwon | H04W 74/0833 370/329 |
| 2011/0317626 A1 | 12/2011 | Cho et al. | |
| 2014/0233528 A1 | 8/2014 | Webb et al. | |
| 2014/0241297 A1* | 8/2014 | Park | H04W 74/0833 370/329 |
| 2018/0176710 A1* | 6/2018 | Jang | H04W 24/10 |

FOREIGN PATENT DOCUMENTS

| | | | |
|---|---|---|---|
| EP | 2 670 206 A1 | 12/2013 | |
| WO | WO-2013069656 A1 * | 5/2013 | H04B 7/005 |

OTHER PUBLICATIONS

Huawei, Hisilicon; "Design Impact on Reliability for LTE URLLC;" 3GPP TSG RAN WG1 Meeting #91; Nov.-Dec. 2017; pp. 1-4.

"3GPP TS38.214, 3rd Generation Partnership Project; Technical Specification Group Radio Access Network; NR; Physical layer procedures for data (Release 15); V15.2.0;" Jun. 2018; pp. 1-474.

"3GPP TS38.331, 3rd Generation Partnership Project; Technical Specification Group Radio Access Network; NR; Radio resource control (Release 15); V15.4.0;" Dec. 2018; pp. 1-72.

Hoshyar, R., et al.; "Novel low-density signature for synchronous cdma systems over awgn channel;" IEEE Transactions on Signal Processing; vol. 56; No. 4; Apr. 2008; pp. 1616-1626.

Nikopour, H., et al.; "Sparse code multiple access;" 2013 IEEE 24th Annual International Symposium on Personal, Indoor, and Mobile Radio Communications (PIMRC); Sep. 2013; pp. 332-336.

Taherzadeh, M., et al.; "SCMA codebook design;" 2014 IEEE 80th Vehicular Technology Conference (VTC2014—Fall); Sep. 2014; pp. 1-5.

Yoshida, M., et al.; "Analysis of sparsely-spread cdma via statistical mechanics;" 2006 IEEE International Symposium on Information Theory; Jul. 2006; pp. 2378-2382.

Verdu, S., et al.; "Spectral efficiency of cdma with random spreading;" IEEE Transactions on Information Theory; vol. 15; No. 2; Mar. 1999; pp. 622-640.

Shental, O., et al.; "Low-density code-domain noma: Better be regular;" 2017 IEEE International Symposium on Information Theory (ISIT); Jun. 2017; pp. 2628-2632.

MacNeish, H.F.; "Euler squares;" Annals of Mathematics; vol. 23; No. 3; Mar. 1992; pp. 221-227; http://www.jstor.org/stable/1967920.

"3GPP specification TS 36.300, LTE; Evolved Universal Terrestrial Radio Access (E-UTRA) and Evolved Universal Terrestrial Radio Access Network (E-UTRAN); Overall description; Stage 2, V 15.3.0, Chapter 10.1.5. Random Access Procedure;" Oct. 2018; pp. 1-366.

Vural, S., et al.; "Dynamic Preamble Subset Allocation for RAN Slicing in 5G Networks;" IEEE Access; vol. 6; Mar. 2018; pp. 13015-13032.

* cited by examiner

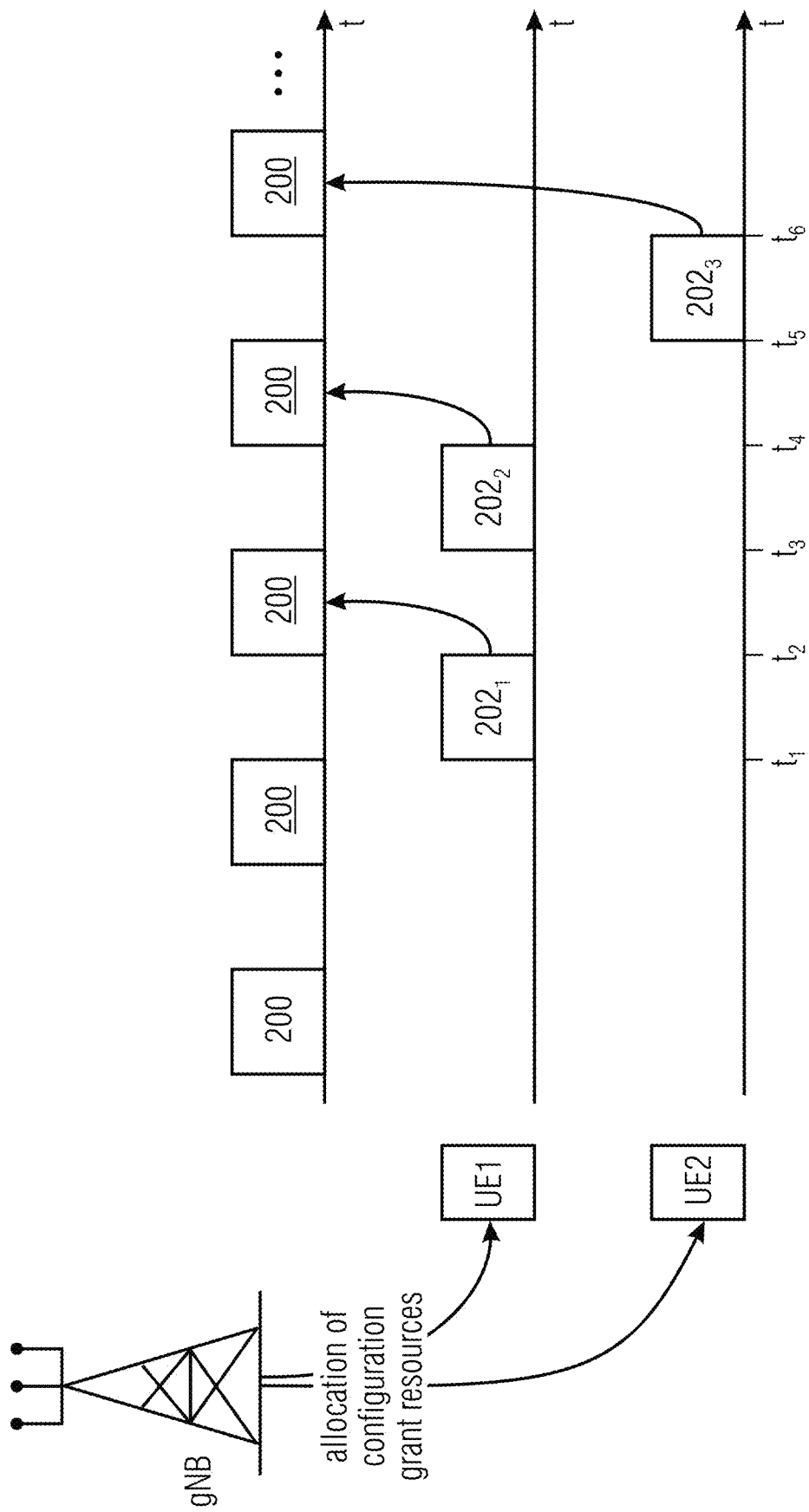

| PHY Parameter | RRC Parameter (SIB2) | Description |
|---|---|---|
| $N_{period}^{NPRACH}$ | nprach-Periodicity | NPRACH resource periodicity |
| $N_{scoffset}^{NPRACH}$ | nprach-SubcarrierOffset | Frequency location of the first subcarrier allocated to NPRACH |
| $N_{sc}^{NPRACH}$ | nprach-NumSubcarriers | number of subcarrier allocated to NPRACH |
| $N_{sc\_cont}^{NPRACH}$ | nprach-NumCBRA-StartSubcarriers | number of starting sub-carriers allocated to contention based NPRACH random access |
| $N_{rep}^{NPRACH}$ | numRepetitionsPerPreambleAttempt | number of NPRACH repetitions per attempt |
| $N_{start}^{NPRACH}$ | nprach-StartTime | NPRACH starting time |
| $N_{MSG3}^{NPRACH}$ | nprach-SubcarrierMSG3-RangeStart | fraction for calculating starting subcarrier index for the range of NPRACH subcarriers reserved for indication of UE support for multi-tone msg3 transmission |

Fig. 5a    Prior Art

```
NPRACH-Parameters-NB-r13::=     SEQUENCE {
  nprach-Periodicity-r13           ENUMERATED {ms40, ms80, ms160, ms240,
                                                ms 320, ms 640, ms1280, ms2560},
  nprach-StartTime-r13             ENUMERATED {ms8, ms16, ms32, ms64,
                                                ms 128, ms 256, ms512, ms1024},
  nprach-SubcarrierOffset-r13      ENUMERATED {n0, n12, n24, n36, n2, n18, n34, spare1},
  nprach-NumSubcarriers-r13        ENUMERATED {n12, n24, n36, n48},
  nprach-SubcarrierMSG3-RangeStart-r13  ENUMERATED {zero, oneThird, twoThird, one},
  maxNumPreambleAttemptCE-r13      ENUMERATED {n3, n4, n5, n6, n7, n8, n10, spare1},
  numRepetitiosPerPreambleAttempt-r13   ENUMERATED {n1, n2, n4, n8, n16, n32, n64, n128},
  npdcch-NumRepetitios-RA-r13      ENUMERATED {r1, r2, r4, r8, r16, r32, r64, r128,
                                                r256, r512, r1024, r2048,
                                                spare4, spare3, spare2, spare1},
  npdcch-StartSF-CSS-RA-r13        ENUMERATED {v1dot5, v2, v4, v8, v16, v32, v48, v64},
  npdcch-Offset-RA-r13             ENUMERATED {zero, oneEighth, oneFourth, threeEighth}
}
```

Fig. 5b    Prior Art

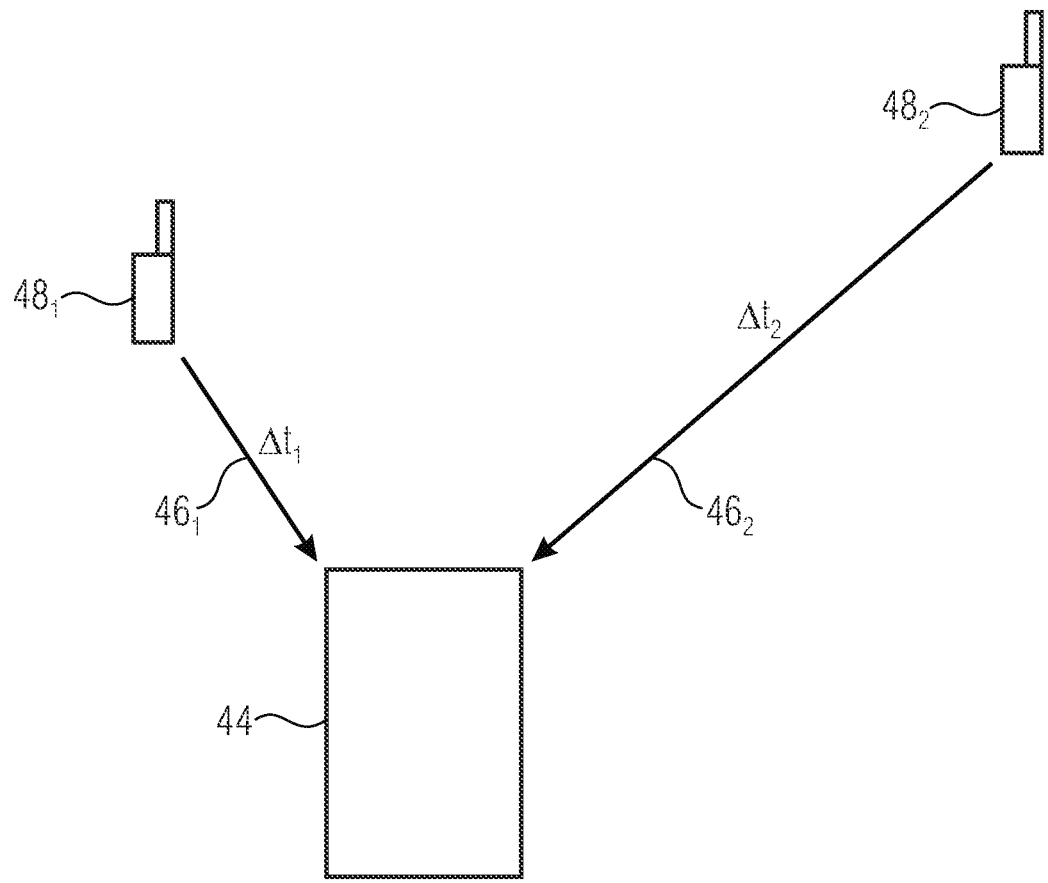
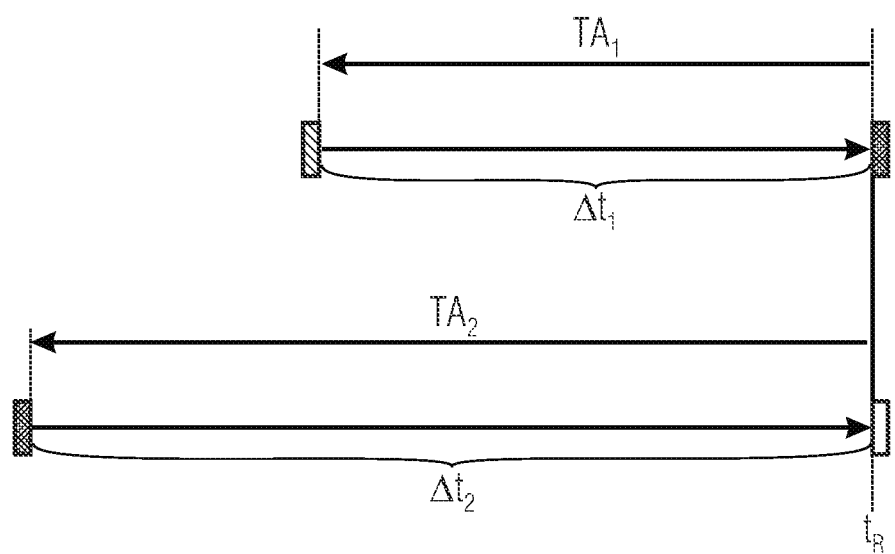
Fig. 11

$$F(4,3) = \begin{pmatrix} 1 & 0 & 0 & 0 & 0 & 1 & 0 & 0 & 0 & 0 & 1 & 0 & 0 & 0 & 0 & 0 \\ 0 & 1 & 0 & 0 & 1 & 0 & 0 & 0 & 0 & 0 & 0 & 1 & 0 & 0 & 1 & 0 \\ 0 & 0 & 1 & 0 & 0 & 0 & 0 & 1 & 1 & 0 & 0 & 0 & 0 & 1 & 0 & 0 \\ 0 & 0 & 0 & 1 & 0 & 0 & 1 & 0 & 0 & 1 & 0 & 0 & 0 & 0 & 0 & 0 \\ 1 & 0 & 0 & 0 & 0 & 0 & 1 & 0 & 0 & 0 & 0 & 1 & 0 & 1 & 0 & 0 \\ 0 & 1 & 0 & 0 & 0 & 0 & 0 & 1 & 0 & 0 & 1 & 0 & 1 & 0 & 0 & 0 \\ 0 & 0 & 1 & 0 & 1 & 0 & 0 & 0 & 0 & 1 & 0 & 0 & 0 & 0 & 0 & 1 \\ 0 & 0 & 0 & 1 & 0 & 1 & 0 & 0 & 1 & 0 & 0 & 0 & 0 & 0 & 1 & 0 \\ 1 & 0 & 0 & 0 & 0 & 0 & 0 & 1 & 0 & 1 & 0 & 0 & 0 & 0 & 1 & 0 \\ 0 & 1 & 0 & 0 & 0 & 0 & 1 & 0 & 1 & 0 & 0 & 0 & 0 & 0 & 0 & 1 \\ 0 & 0 & 1 & 0 & 0 & 1 & 0 & 0 & 0 & 0 & 0 & 1 & 1 & 0 & 0 & 0 \\ 0 & 0 & 0 & 1 & 1 & 0 & 0 & 0 & 0 & 0 & 1 & 0 & 0 & 1 & 0 & 0 \end{pmatrix}$$

$$F(4,2) = \begin{pmatrix} 1 & 0 & 0 & 0 & 0 & 1 & 0 & 0 & 0 & 0 & 1 & 0 & 0 & 0 & 0 & 0 \\ 0 & 1 & 0 & 0 & 1 & 0 & 0 & 0 & 0 & 0 & 0 & 1 & 0 & 0 & 1 & 0 \\ 0 & 0 & 1 & 0 & 0 & 0 & 0 & 1 & 1 & 0 & 0 & 0 & 0 & 1 & 0 & 0 \\ 0 & 0 & 0 & 1 & 0 & 0 & 1 & 0 & 0 & 1 & 0 & 0 & 0 & 0 & 0 & 0 \\ 1 & 0 & 0 & 0 & 0 & 0 & 1 & 0 & 0 & 0 & 0 & 1 & 0 & 1 & 0 & 0 \\ 0 & 1 & 0 & 0 & 0 & 0 & 0 & 1 & 0 & 0 & 1 & 0 & 1 & 0 & 0 & 0 \\ 0 & 0 & 1 & 0 & 1 & 0 & 0 & 0 & 0 & 1 & 0 & 0 & 0 & 0 & 0 & 1 \\ 0 & 0 & 0 & 1 & 0 & 1 & 0 & 0 & 1 & 0 & 0 & 0 & 0 & 0 & 1 & 0 \\ 1 & 0 & 0 & 0 & 0 & 0 & 0 & 1 & 0 & 1 & 0 & 0 & 0 & 0 & 1 & 0 \\ 0 & 1 & 0 & 0 & 0 & 0 & 1 & 0 & 1 & 0 & 0 & 0 & 0 & 0 & 0 & 1 \\ 0 & 0 & 1 & 0 & 0 & 1 & 0 & 0 & 0 & 0 & 0 & 1 & 1 & 0 & 0 & 0 \\ 0 & 0 & 0 & 1 & 1 & 0 & 0 & 0 & 0 & 0 & 1 & 0 & 0 & 1 & 0 & 0 \end{pmatrix}$$

Fig. 17c

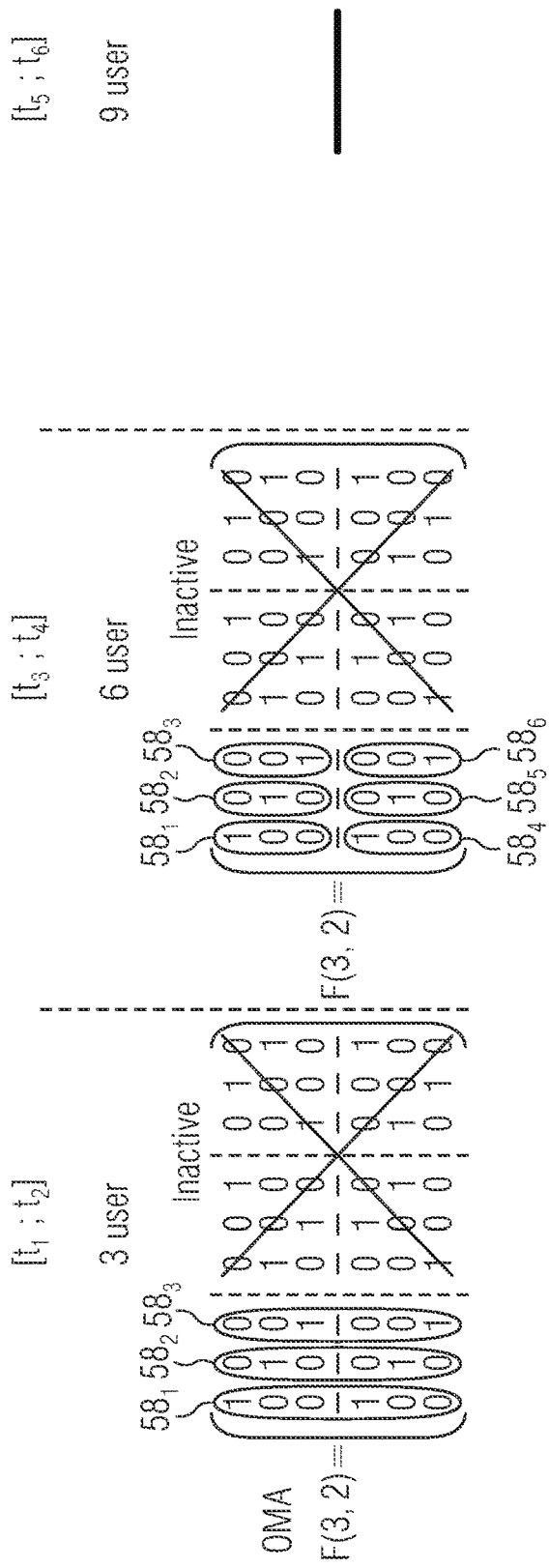
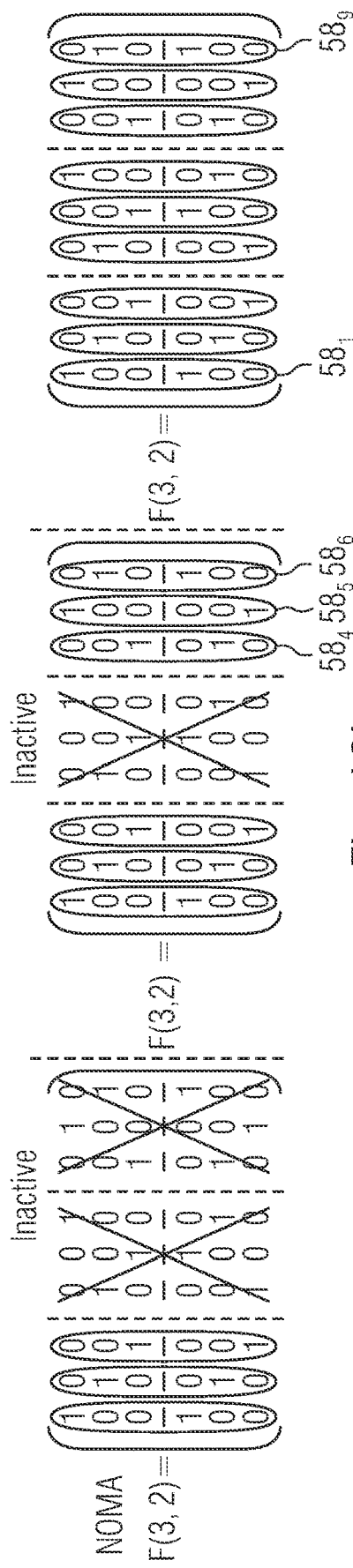
Fig. 19a
Fig. 19b

DATA-CENTRIC EVENT-BASED RANDOM ACCESS PROCEDURE

CROSS-REFERENCES TO RELATED APPLICATIONS

This application is a continuation of copending International Application No. PCT/EP2020/066956, filed Jun. 18, 2020, which is incorporated herein by reference in its entirety, and additionally claims priority from European Application No. EP 19181355.9, filed Jun. 19, 2019, which is incorporated herein by reference in its entirety.

The present invention relates to the field of mobile communication systems or networks, more specifically to devices, base stations, methods for operation the same and to a computer program for enhancing data transmission. The present invention in particular relates a method for data-centric event-based random access procedure.

BACKGROUND OF THE INVENTION

FIGS. 1a and 1b comprise a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network RAND that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs
- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

In a wireless communication system, e.g., the one described above with reference to FIG. 1, configured grant, CG, transmissions may be implemented as described, e.g., in reference [1], which allow a low latency communication by authorizing a user equipment, UE, to transmit a message without a scheduling grant for this message. FIG. 2 schematically illustrates the concept of CG transmissions in a mobile communication network, for example a NR or 5G network. FIG. 2 illustrates schematically a single cell, for example, a cell as depicted above in FIG. 1, including the base station gNB as well as two mobile devices UE1, UE2, for example vehicles or the like. The base station gNB allocates time-frequency resources on which a CG transmission is to be performed. FIG. 2 illustrates the time-frequency resources 200 that are provided or allocated by the gNB for CG transmissions, for example, with a certain periodicity. The configured grant resources 200 may be randomly utilized by the user as UE1, UE2 when they have data to transmit. By assigning the configured grant resources, the system or network eliminates the packet transmission delay for a scheduling request procedure and increases the utilization ratio of the allocated radio resources. In the example of FIG. 2, the user UE1 has data $202_1$ to be transmitted. The data $202_1$ may be available or generated at a time t1, and at a time $t_2$ the data $202_1$ may be transmitted by the user UE1 using the configured grant resources without the need for a scheduling request procedure. Further data $202_2$ may be available at time t3, and the data may be transmitted using the configured grant resources at time t4. At the other user, UE2, data $202_3$ may be available at a time t5 which is then transmitted using the CG resources at time t6. The time-frequency resources, also referred to as the CG resources or the CG resource pool, on which the CG transmission is transmitted may be preconfigured, for example via radio resource control, RRC, signaling alone, also referred to as a CG type 1, or via RRC signaling and downlink L1/L2 signaling, also referred to as CG type 2 (see references [1] and [2]). CG transmissions as explained above with reference to FIG. 2 may be used for low latency applications, for example for an ultra-reliable low-latency communication, URLLC, for vehicle-to-everything, V2X, scenarios or applications or device-to-device, D2D, scenarios or applications.

It is noted that the information in the above section only for enhancing the understanding of the background of the invention and therefore it may contain information that does not form conventional technology that is already known to a person skilled in the art.

When considering a wireless communication scenario where multiple devices (users) communicate with a base-station, due to limited resources, the available (physical) channels need to be shared among all users and random-access (RA) protocols may be implemented to resolve contention each time the users communicate with the base-station. During RA, a device selects randomly a preamble which needs to be detected at the base-station in order to resolve the (device) identity and in order to assign grants to the device. Random access channels (RACH) may be used differently in LTE (Long Term Evolution). In LTE, RACH processes may happen in the following situations, see, for example 3GPP specification, 10.1.5 Random Access Procedure of 36.300:
  i) Initial access from status RRC (radio resource control) idle;
  ii) RRC connection reestablishment procedure;
  iii) Handover (contention based or non-contention based);
  iv) DL (downlink) data arrival during RRC Connected state, requiring random access procedure, e.g., when UL (uplink) synchronization status is "non-synchronized";
  v) UL data arrival during RRC Connected requiring random access procedure, e.g., when UL synchronization status is "non-synchronized" or there are no PUCCH (physical uplink control channel) resources for SR (scheduling request) available;
  vi) For positioning proposed during RRC Connected requiring random access procedure, e.g., when timing advance is needed for UE (user equipment) positioning.

FIG. 3 shows a schematic flowchart of a random access procedure for NB-IOT devices (Narrowband Internet of Things). The random access procedure for NB-IOT may work as follows:
  1. Devices transmit a randomly selected preamble on NPRACH (Narrowband Physical RACH). The preamble parameter may be defined in the SIB (system information block). The preamble may depend on a Coverage Class (CC), wherein each CC may have its own preamble space. Each UE may select randomly from the CC preamble set.
  2. The base station (eNB) may detect the preamble and may respond with the preamble index, time alignment (TA) offset and UL grant. That is, the eNB may detect the preamble and measure the TA. It may send the preamble ID with UL-grant and TA.
3. The UE may send signaling information (identity) to request RRC connection request. That is, the UE may send its identity on granted resources and may request an RRC connection.
4. eNB acknowledges signaling information received from the device with RRC connection setup message. That is, the eNB may resolve contention by sending RRC connection setup.
5. UE transmits data concatenated with the RRC connection setup complete message.

In more detail: Prior to sending the NPRACH preamble, the UE uses the PSS (primary synchronization channel) and SSS (secondary synchronization channel) from the eNB to synchronize itself with symbol timing and carrier frequency of the eNB. Further, it measures reference receive power to select (itself) a coverage class. There are three classes defined, each leading to different parameters for the NPRACH preamble. Then, from the system information block found in the NPDCCH (narrowband physical downlink control channel), the UE determines the starting time and length of the preamble sequences (which again is determined by the coverage class). The NPRACH employs an orthogonal signal-tone frequency hopping pattern which is contrast to legacy LTE PRACH. NPRACH preamble is transmitted within 180 kHz range which is made-up of 48 subcarriers with the subcarriers spacing of 3.75 kHz. Basically NPRACH preamble is transmitted in repetition and at each repetition it hops to a different subcarrier according to rules illustrated in FIG. 4 showing a NPRACH time-frequency allocation. Thus, each $n_{init}$ results in an orthogonal hopping pattern, which leads to 48 possible (hopping) sequences. Due to the single repetition value configuration, each active IoT device will contend on all 48 subcarriers and thus each subcarrier has an equal probability (1/48) to be chosen. A list of parameters for the NPRACH is shown in FIG. 5a, wherein FIG. 5b shows an example parameter set thereof.

If the preamble is successfully detected, the eNB responds with a message containing:
Time-alignment offset (TAO/TA)
Preamble index (of the received preamble);
UL-resource grant Then, the UE transmits its identity using the schedule resources and the eNB sends a contention resolution message (in case multiple UEs selected the same preamble).

Starting from conventional technology as described above, there may be a need for improvements in the wireless communication in view a latency of communication.

SUMMARY

According to an embodiment, a device for communicating in a wireless communication network to transmit transmission information, by transmitting a wireless signal in a Random Access Channel of the wireless communication network, may have: a wireless interface configured for transmitting the wireless signal; a control unit configured for providing the wireless signal so as to include a random access preamble; wherein the control unit is configured for selecting the random access preamble such that the random access preamble is associated with the transmission information.

According to another embodiment, a device for communicating in a wireless communication network by transmitting a wireless signal, the wireless communication network being operated by a base station by use of a synchronization at the base station, may have: a wireless interface; wherein the device is configured for transmitting, with the wireless interface, one of a first wireless signal and a second wireless signal synchronized with the base station and for transmitting the other wireless signal unsynchronized with the base station or with an individualized timing at the base station; or wherein the device is configured for transmitting the first wireless signal and the second wireless signal unsynchronized with the base station or with an individualized timing at the base station; wherein the first and/or second wireless signal is associated with contention resolution at the base station.

Yet another embodiment may have a base station for operating a wireless communication network so as to provide for a random access resource to be used by a device for a random access procedure for transmitting a wireless signal having a random access preamble of a plurality of random access preambles; wherein the base station is configured for associating a random access preamble received with a first wireless signal to a transmission information being reported by the device and for not associating a second random access preamble received with a second wireless signal with the transmission information.

Still another embodiment may have a base station for operating a wireless communication network; wherein the base station is configured for operating the wireless communication network such that a device communicating in the wireless communication network compensates for a timing offset based on a channel delay so as to synchronize with the base station; wherein the base station is configured for controlling the device so as to transmit a wireless signal for contention resolution unsynchronized with the base station or with an individualized timing at the base station.

The inventors have recognized that data transmission may face a low latency when the preamble selected by the UE and to be transmitted in a random access channel is associated with information that has to be transported. Information is related to more than just the request to get assigned or allocated a resource but in view of different preambles having different meanings.

According to an embodiment, a device for communicating in a wireless communication network to transmit transmission information by transmitting a wireless signal in a Random Access Channel of the wireless communication network comprises a wireless interface configured for transmitting the wireless signal and a control unit configured for providing the wireless signal so as to comprise a random access preamble. The control unit is configured for selecting the random access preamble such that the random access preamble is associated with the transmission information.

The inventors have further found that a low latency communication may be obtained by allowing a contention resolution by a variation in the time-alignment/timing advance.

A device for communicating in a wireless communication network by transmitting a wireless signal, the wireless communication network operated by a base station by use of a synchronization at the base station in accordance with this finding comprising a wireless interface. The device is configured for transmitting, with the wireless interface, one of a first wireless signal and a second wireless signal synchronized with the base station and for transmitting the other wireless signal unsynchronized with the base station or with an individualized timing at the base station. Alternatively or in addition, the device is configured for transmitting the first wireless signal and the second wireless signal unsynchronized with the base station or with an individualized timing at the base station. The first and/or the second wireless signal is associated with contention resolution at the base station.

Further embodiments relate to base stations, to a wireless communication network, to method for operating a device, to methods for operating a base station and to a computer program.

BRIEF DESCRIPTION OF THE DRAWINGS

Embodiments of the present invention will be detailed subsequently referring to the appended drawings, in which:

FIG. 2 illustrates schematically a single cell, for example, a cell as depicted in FIG. 1;

FIG. 5a shows a list of parameters for the NPRACH;

FIG. 5b shows an example parameter set of the parameters of FIG. 5a;

FIG. 11 shows a schematic block diagram of a wireless communication network according to an embodiment;

FIG. 17c a concept for reducing the number of resources mapped to subsets whilst maintaining the number of subsets;

FIG. 19a shows a schematic illustration of an example scenario in which six resources operated by the base station are mapped using an Euler-square mapping according to an embodiment;

FIG. 19b shows a schematic representation of the scenario of FIG. 9a, orthogonal communication and also non-orthogonal communication is used according to an embodiment;

DETAILED DESCRIPTION OF THE INVENTION

Figure 1A:
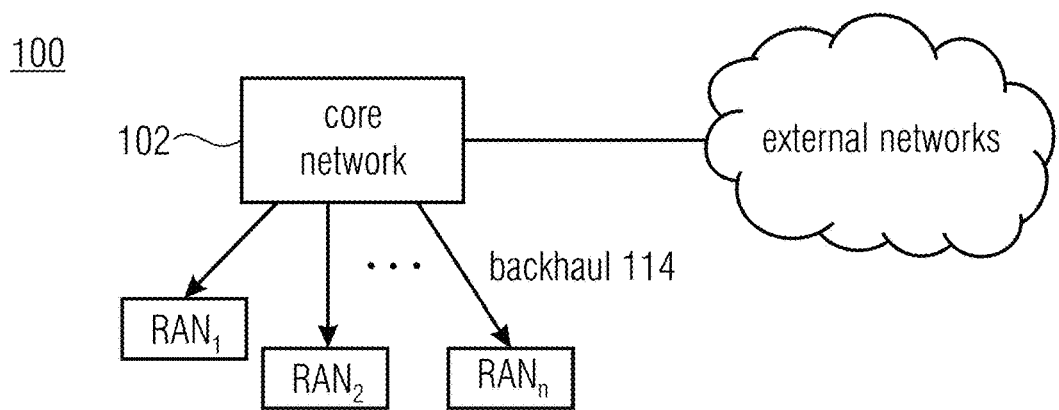
FIG. 1a is a schematic representation of an example of a terrestrial wireless network.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Although the embodiments described herein may relate, at least in part, to narrowband transmissions, the invention is not limited hereto. Other embodiments may relate to different types of RACH procedures and/or channels.

Figure 6:
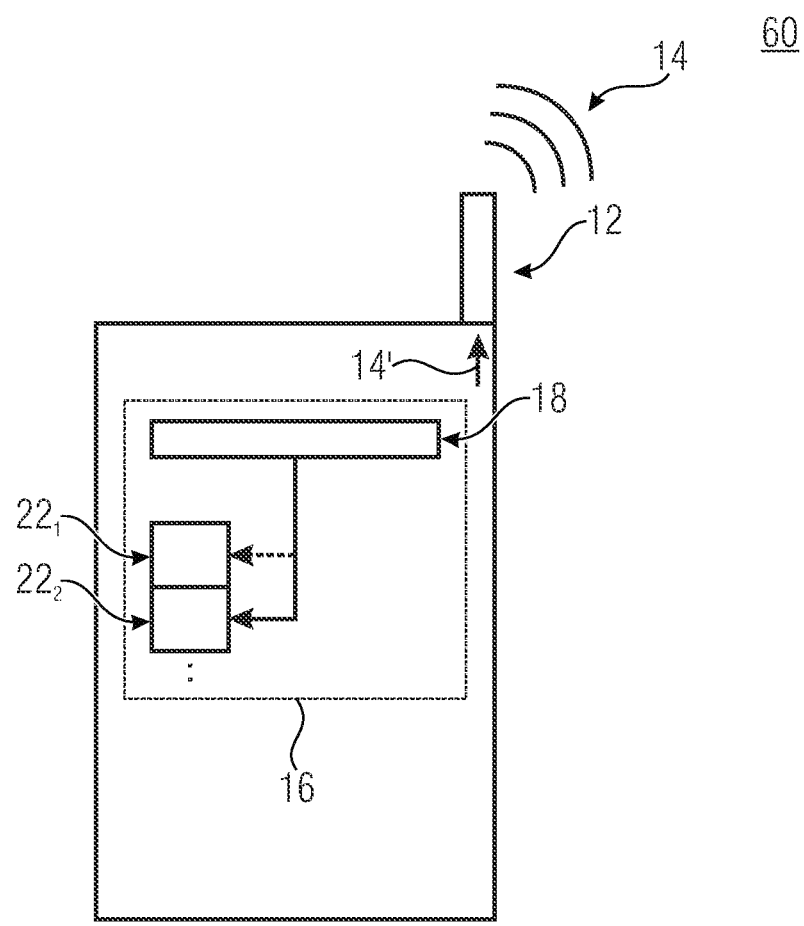
FIG. 6 shows a schematic block diagram of a device according to an embodiment.

FIG. 6 shows a schematic block diagram of a device 60 according to an embodiment. For example, the device 60 may be a narrow band Internet-of-Things (IoT)—NB-IoT device configured for transmitting the wireless signal 14 in a narrow band physical random access channel. The wireless device 60 comprises a wireless interface 12 configured for transmitting a wireless signal 14. The device 60 may be configured for communicating in a wireless communication network, for example, in the terrestrial wireless network 100, for example, as UE and/or IoT device. According to other embodiments, the wireless communication network in which the device 60 operates is not a terrestrial network but a different network, for example, a satellite communication network or the like.

The device 60 may be configured for transmitting the wireless signal 14 in a Random Access Channel (RACH) of the wireless communication network. That is, the device 60 may utilize a resource (time, frequency, code and/or space) being adapted to be accessed by more than one device at a time.

The device 60 comprises a control unit 16 being configured for providing the wireless signal 14 by generating respective signals 14' which are supplied to the wireless device 12 so as to generate the wireless signal 14 based on the signal 14'. The control unit 16 may include a preamble, for example, comprising pilot symbols, into the signal 14' and thus the wireless signal 14.

The device 60 may have information 18 to be transmitted. The information 18 may be referred to as a transmission information, i.e., an information of a specific type of information going beyond the content that a resource for transmission is requested. Such a request for a later transmission may be known from conventional technology and may be equal—with regard to the information content—for all UEs accessing known RACH resources. A transmission information, in contrast, may be based on an event at the device 60. For example, it may be based on an agreed time horizon, for example, that a certain time has come or that a specific event has been recognized. Such an event may be, for example, that the sun is shining which may be relevant, for example, for a solar panel.

Alternatively or in addition, the transmission information may be based on an at least one of the following:
identifier of the device or
arrival of a message
pre-configuration of the network
device class
service class of the message
priority class of the message
reliability class of the message
latency class of the message
message type
message content
device priority
service policy
channel occupancy/quality measure such as a Channel Busy Ratio (CBR) in unlicensed bands or CSI/CQI measurement results For example, if a flow/bearer is based on QoS, the message may inherit one or more of these properties from the flow/bearer, e.g., the service class of the message.

For example, for a wind turbine, for example, information received from a sensor and reporting about a wind activity may be of interest. Further, the transmission information may be based on a service class, a priority class, a latency requirement, a message type, a message content or the like. Such transmission information may be configured, for example, by an eNB/gNB or any other entity or may be determined at the device 60. For example, a packet may arrive and the event may be triggered if it is of a certain service or priority. For example, the event may be based thereon that there is no scheduled grant available. Alternatively, the event may also be remotely triggered. A reception of a wakeup signal or of a paging message are examples for such remotely triggered events. Another example, is an urgent message to the device. Another example, may be the device 60 being a relay and which is in a power saving mode. Such a wakeup signal may be sent by a second transmitter to turn on or activate the link over the relay. The control unit 16 may be adapted, instructed or programmed by a base station, e.g., triggered by a certain event (e.g. handover, cell load condition or other higher layer procedures) or configured in a semi-persistant fashion (specific time intervals or based on certain conditions). Alternatively or in addition, the control unit may retrieve information with regard to a meaning of a respective preamble by a manufacturer or other devices that may, for example, broadcast or distribute respective information. That is, the linkage of transmission information to a specific preamble may be static or variable/dynamic.

The control unit 16 may be configured for selecting a random access preamble 22 so as to be transmitted with the wireless signal 14 in such a way, that the random access preamble 22 is associated with the transmission information. That is, the wireless communication network may provide for a plurality of random access preambles 22, e.g., the random access preamble 22$_1$ and 22$_2$. The control unit 16 may select from an available subset of random access preambles a random access preamble from which it knows that it will be interpreted at the receiver so as to at least in part indicate the information 18.

Although a selection between two random access preambles 22$_1$ and 22$_2$ is shown in FIG. 6, the selection may be made among only one random access preamble and among more than two random access preambles, for example, at least three, at least 4, at least 5, at least 10, at least 15 of even more, wherein the different preambles may be orthogonal with respect to each other but may also be non-orthogonal.

In a scenario where the selection is made of only one random access preamble, the device 60 may be instructed or adapted by external information, for example, from the network provider or a base station, that a specific event or a specific transmission information is to be substituted or indicated by a specific preamble. Thus, the device 60 may straightforwardly select the indicated random access preamble. If, for example, the device 60 has only one type of message or one type of message class, it may probably use only one single preamble. However, this may be interpreted at the receiver as an indicator that a specific event has occurred or that a specific transmission information is received, based on the contained random access preamble.

Alternatively, a specific message, message class or other type of transmission information may be indicated by a subset of all possible random access preambles with more than one random access preamble such that the control unit 16 may perform a selection between more than one random access preamble.

As will be described later, different types of transmission information may, optionally, be associated with different subsets of random access preambles, each subset containing at least one random access preamble. This allows for an increased diversification of transmitted information.

By associating the random access preamble with the transmission information, i.e., with a specific meaning which differs from other random access preambles in the network, it is possible to already transmit transmission information with the random access preamble, which may provide for a synergetic use of the random access preamble. For example, the random access preamble may, optionally, still be interpreted as a request for a resource grant.

Selection of the preamble may be performed, by the control unit 16, for example, at the PHY layer. The control unit 16 may receive from a higher layer such as an application layer or an application of the device an information indicating, for example, related to a Quality of Service (QoS) related to the event. The control unit 16 may be configured for selecting the random access preamble 22 based on the QoS information. The QoS information may indicate a highly useful or requested latency, a priority or priority clause of the message or information, a message type, a message content, or simply a service of the network requested or highly useful. An event that causes the device to transmit the transmission information may be related to data collected by the device, for example, by using a sensor or sensor arrangement of the device. Alternatively or in addition, the event may relate to data received by the device, for example, instructions from other devices or data to be forwarded as a relay.

Figure 7A:
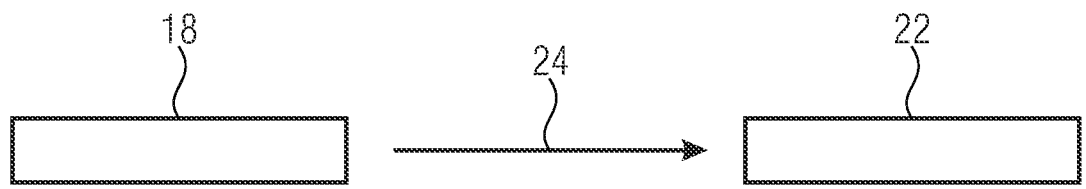
FIG. 7a shows a schematic block diagram for illustrating a relationship between information transmitted according to an embodiment and a selected random access preamble.

FIG. 7a shows a schematic block diagram for illustrating a relationship between the information 18 and the random access preamble 22. The control unit may be configured for receiving information, for example, from an application layer or a different higher layer, the information 18 indicating a preconfigured message to be transmitted with the wireless interface of the device. The control unit may perform a selection 24 so as to select the random access preamble 22 such that the random access preamble at least partially represents the preconfigured message, i.e., the information 18.

Figure 7B:
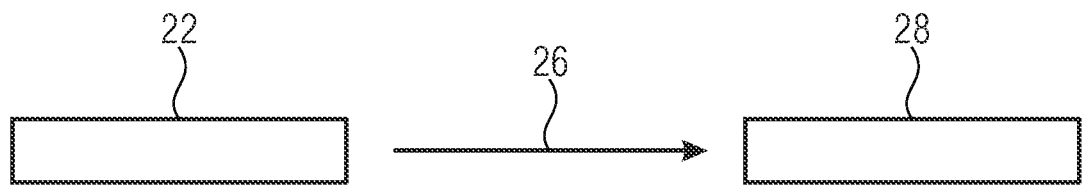
FIG. 7b shows a schematic block diagram of an interpretation of the random access preamble according to an embodiment, which may be performed, for example, at a receiver of the random access preamble.

FIG. 7b shows a schematic block diagram of an interpretation of the random access preamble, which may be performed, for example, at a receiver of the random access preamble 22. At the receiver, an interpretation 26 may be executed on the random access preamble 22 so as to derive derived information 28 from the random access preamble 22. The derived information 28 may at least in part represent the information 18. For example, the derived information 28 may indicate a message clause, a type of alarm, a priority or the like of the information 18 but may also indicate completely the information 18.

Figure 8A:
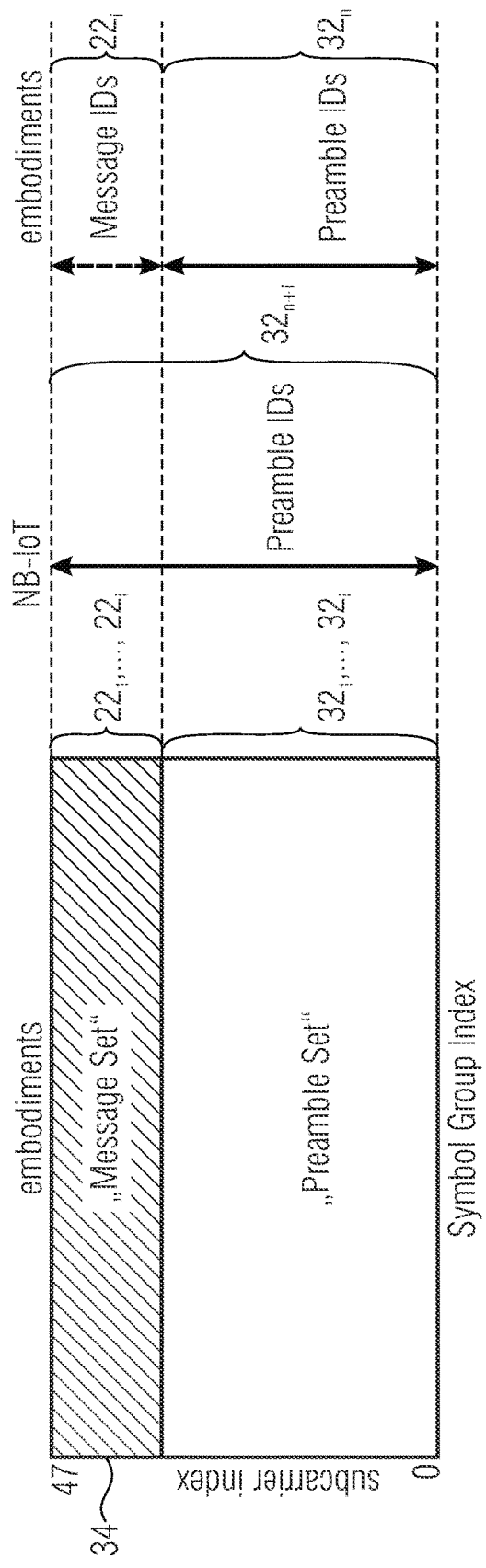
FIG. 8a shows a schematic diagram for illustrating an example relationship between random access preambles being associated with a transmission information and unassociated preambles.

FIG. 8a shows a schematic diagram for illustrating an example relationship of random access preambles 22 being associated with a transmission information and to regular, possibly unassociated preambles 32. The example is explained in connection with NB-IOT, wherein the embodiments may be transferred, without any limitation, to other random access procedures. However, in connection with NB-IOT, there are specific advantages as narrow band transmissions highly benefit from a reduced amount of messages to be transmitted when compared to broad band systems.

In NB-IOT an associated preambles $32_{n+i}$, may be used, for example, in a number of 48 having a subcarrier index ranging from 0 to 47, i.e., n+1=48.

Embodiments relate to use a subset of the preambles, each represented by a preamble ID so as to be associated with a specific message that may be represented by a message ID. The message may carry the information 18 at least in parts.

That is, the network may be implemented such that a selection of one of the random access preambles $22_1, \ldots, 22_i$ is interpreted, at the receiver, in a specific way.

Each message ID, i.e., each random access preamble 22 may be associated with an individual message or message ID. Alternatively, a message ID or a content of the message may be associated with a number of more than 1 random access preambles so as to allow diversification and possibly a low number of collisions at the receiver as different devices 60 may select for different random access preambles even if transmitting a same message.

That is, the control unit may be configured for selecting the random access preamble based on the event or from a set 34 of random access preambles having at least one random access preamble. The set 34 of random access preambles 22 may be a dedicated subset of random access preambles of the wireless communication network.

Although the preambles $22_1, \ldots, 22_i$ are illustrated as forming a continuous space in the index space by having consecutive sub carrier indexes and/or preamble IDs, the preambles having an associated transmission information may be arbitrarily distributed among the sub carrier indexes or may be distributed according to any pattern.

The wireless signal 14 of FIG. 6 may be related to the transmission information as the random access preamble 22 is related to the transmission information. Other messages or signals may be transmitted, for example, using a regular or unassociated random access preamble, for example, a preamble 32. For example, by using the unassociated preamble 32, the device may request or reserve for resources in the wireless communication network for subsequently transmitting a signal. That is, for example, the device may transmit messages requiring a high QoS or a high priority or a low latency or the like, e.g., an alarm, by using preambles 22, wherein other messages, for example, periodic messages indicating a battery status or an alive status or the like via regular communication using the unassociated preambles 32.

In other words, FIG. 8a shows an NPRACH configuration in accordance with an embodiment where a subset 34 is preconfigured for a message signaling.

Figure 8B:
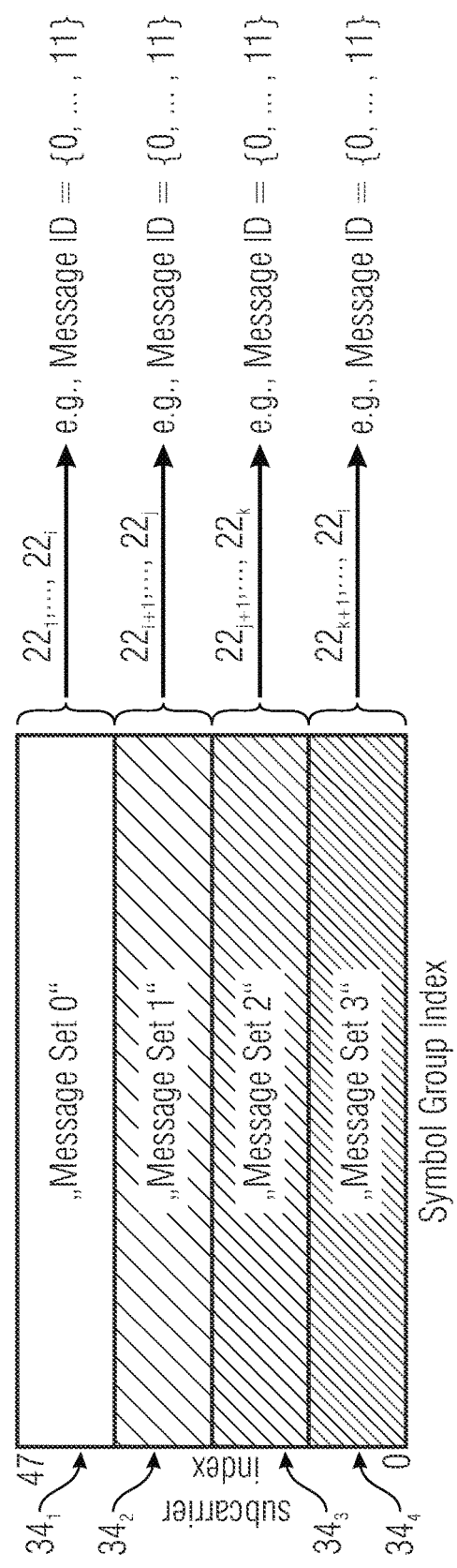
FIG. 8b shows a schematic diagram illustrating a configuration of the device and/or the network, e.g., organized by one or more base stations in accordance with an embodiment.

FIG. 8b shows a schematic diagram illustrating a configuration of the device and/or the network, e.g., organized by one or more base stations in accordance with an embodiment, wherein the preambles are organized in a plurality of distinct subsets $34_1$, $34_2$, $34_3$ and $34_4$, wherein the number of four is chosen as an example only and may be any other value of one or more, two or more, three or more, five or more, e.g., six or even more. Each of the subsets $34_1$ to $34_4$ may comprise one or more preambles. For example, the number of 48 NB-IOT preambles is divided into four subsets that may be, by way of example, equally in view of a size of message IDs.

The assignment of consecutive sub carrier indexes to a common message set or subset 34 is chosen for illustrative reasons only. For example, according to an embodiment, subsequent sub carrier indexes that may be associated with monotonically increasing or decreasing frequency may alternately be assigned to different subsets such that an overall frequency range of each subset 34 increases which may allow to have a low risk of losing a specific message set in the respective transmissions due to a blocking of partial frequency ranges.

As described in connection with FIG. 8a, an association of sub carrier indexes to a specific subset 34 may follow any suitable pattern. Each of the subsets 34 may be a distinct subset, i.e., a random access preamble or sub carrier index is associated to one subset 34 only.

Each of the subsets 34 may comprise an individual or common number of preambles 22, for example, 12. Each of the preambles 22 of a subset 34 may be associated individually, group wise or commonly for the whole subset, with a transmission information. That is, different preambles in one of the subsets may have a same or different meaning.

Alternatively or in addition, messages of different subsets, for example, preamble $22_{i-1}$ and $22_{i+1}$ may have a same or a different transmission information being associated hereto.

Having different subsets, each subset having different random access preambles may allow for organizing the network structure such that the transmission information, the respective message represented by a message ID may be grouped into a respective message set that may form, for example, a kind of category or priority clause or latency clause or the like. Within the message set, one or more different messages may be transmitted. That is, the subset may be associated with a subset identifier such as "Message Set X" or any other suitable value. The subset identifier may be transmitted but may also be known at the receiver, i.e., the receiver may know the group of preambles to which the received preamble is associated or allocated. Thereby, a first information may be received, for example, the message clause of the message. The selected random access preamble itself may be associated with a second information, i.e., a further information. For example, the second information may be the specific message or transmission information associated with the preamble. The first information may, for example, be related to one or more of an information indicating an identifier of the device, information indicating a device clause of the device and information indicating a service class of the event or the transmission information. The second information may be related to one or more of information indicating the transmission information itself and, as described for the first information, a service class of the transmission information. Alternatively or in addition, the second information may be related to information indicating a reliability measure of the device and/or an observation. The reliability measure of the device may be obtained, for example, from a data base, may be indicated as a number or as an index or the like and may indicate how reliable the device is, for example, in view of its communication quality.

Figure 4:
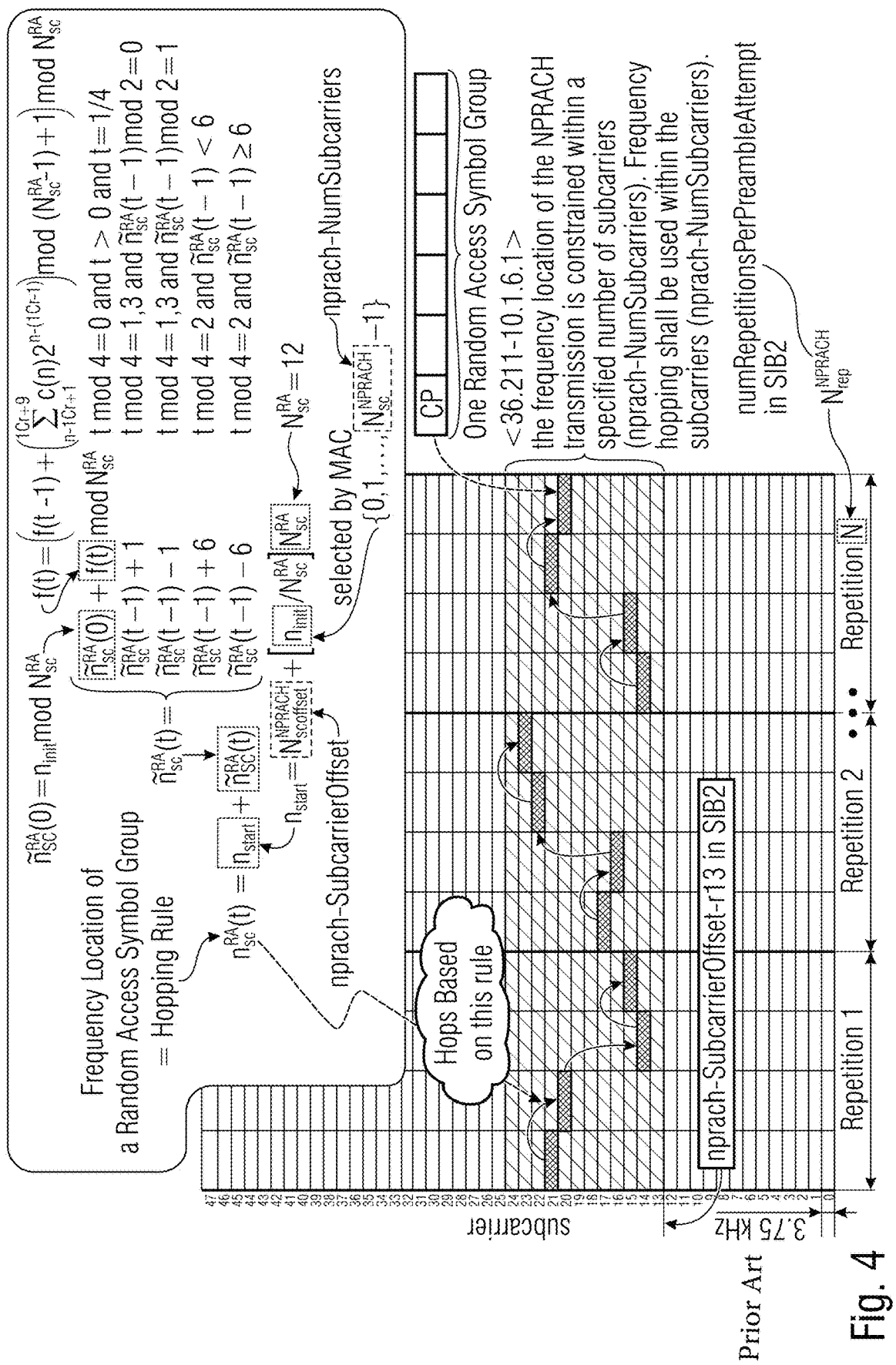
FIG. 4 shows a known NPRACH time-frequency allocation.

In other words, for NB-IOT, embodiments propose an extension to the (NB-IOT) Random Access Protocol. A specific set of preambles is defined, which can be a subset of regular preamble-sequences which serve as messages. The messages may be pre-configured by higher layers, i.e., a specific message may correspond to a preamble ID (PID). By way for example, a preamble ID PID may correspond to a specific alarm or event. Example: PID 0→fire; PID 1→high pressure; . . . . The idea is that this message is set and the mapping is common to all users in the system or at least to a closed group of devices such as sensors, which are configured to use this scheme. One example for the NPRACH is depicted in FIG. 8b, wherein total 48 preambles are defined for the random access. Each preamble index may be identically defined by the position (sub carrier index) of the first sample group as shown in FIG. 4. The set of sequences may be split into a "Message Set", i.e., a subset of the preambles may be reserved for messages, and a "preamble-set", i.e., a set of preambles which is used for random access.

Example: assuming a system where a large number of sensors are deployed to monitor critical events in a factory or process automation-setting. For example, there may be arranged sensors to monitor the condition of machines, temperature, pressure and the like. Assuming all UEs (e.g., sensors) are synchronized to the ENB using PSS/SSS and are configured by higher layers as discussed, if one or multiple UEs detect a specific event (e.g., "high pressure"), the corresponding preamble ID may be transmitted (which may correspond to the message). The ENB may detect the "preamble", the message and may broadcast the detected "preamble ID" together with additional NPRACH configuration. Thus, UEs which send the message ID in the first place are now receiving the confirmation that the message was successfully detected and may initiate a regular random access procedure on the resources which are indicated by the NPRACH configuration if further information has to be transmitted. The NPRACH configuration (configure) may refer to the "preamble set" where UEs perform contention based RA by selecting randomly a preamble out of the "preamble set". Note that this "preamble set" can be in the regular NPRACH or on dedicated resources (which may reduce the collision probability with "other" UEs). After a successful RACH-procedure, the UEs may transmit further information on the detected event on granted resources.

Figure 9:
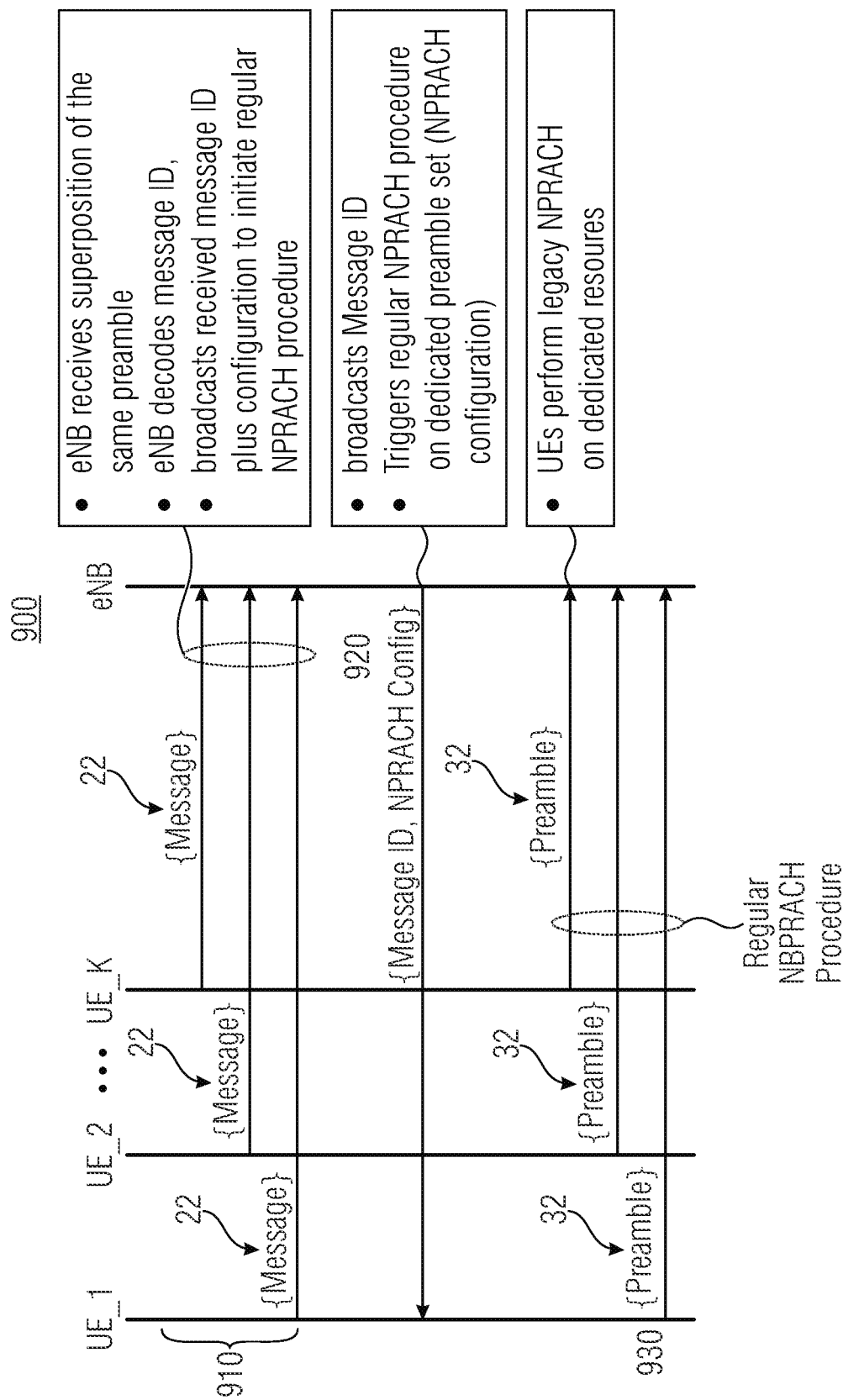
FIG. 9 shows a schematic flow chart of a method for combining the usage of preambles associated with transmission information with NPRACH according to an embodiment.

FIG. 9 shows a schematic flow chart of such a procedure or method 900 for combining the usage of preambles associated with transmission information with NPRACH according to an embodiment. In a step 910 one or more UE may transmit a message ID by use of an associated preamble. The eNB may receive a superposition of the same preamble as all of the UEs may transmit, for example, the same preamble. The eNB may decode the message ID or the preamble ID and may broadcast the message ID or preamble ID in a step 920 so as to trigger a regular NPRACH procedure on a dedicated preamble set (and PRACH configuration). In a step 930 the UEs may perform a legacy NPRACH on the dedicated resources. That is, after having transmitted the wireless signal 14, optionally, the device may be configured for transmitting a further wireless signal comprising further information related to the event or the transmission information after having transmitted the wireless signal 14.

When referring again to FIG. 8b, embodiments are related to define multiple sets of messages/service classes which may be mutual orthogonal. Orthogonality may be used to simplify the received processing and to enable power detection. Otherwise, it is not a prerequisite. The combination of "Message Set ID" plus "Message ID" can be used to hierarchical encode further information in the proposed transmission scheme. As an example; the Message Set ID may be associated with a device, e.g., a machine, whereas each machine can have the same types of events such as "high pressure", "high temperature", . . . , or different events.

This may allow to implement very simple receiver architectures "paw-detection" to detect a "Message Set ID" in the first place since the messages within a "set" occupy an orthogonal subset of carriers.

In other words, FIG. 9 shows a procedure in accordance with an embodiment, where multiple UEs transmit the same message ID using modified NPRACH.

Figure 10A:
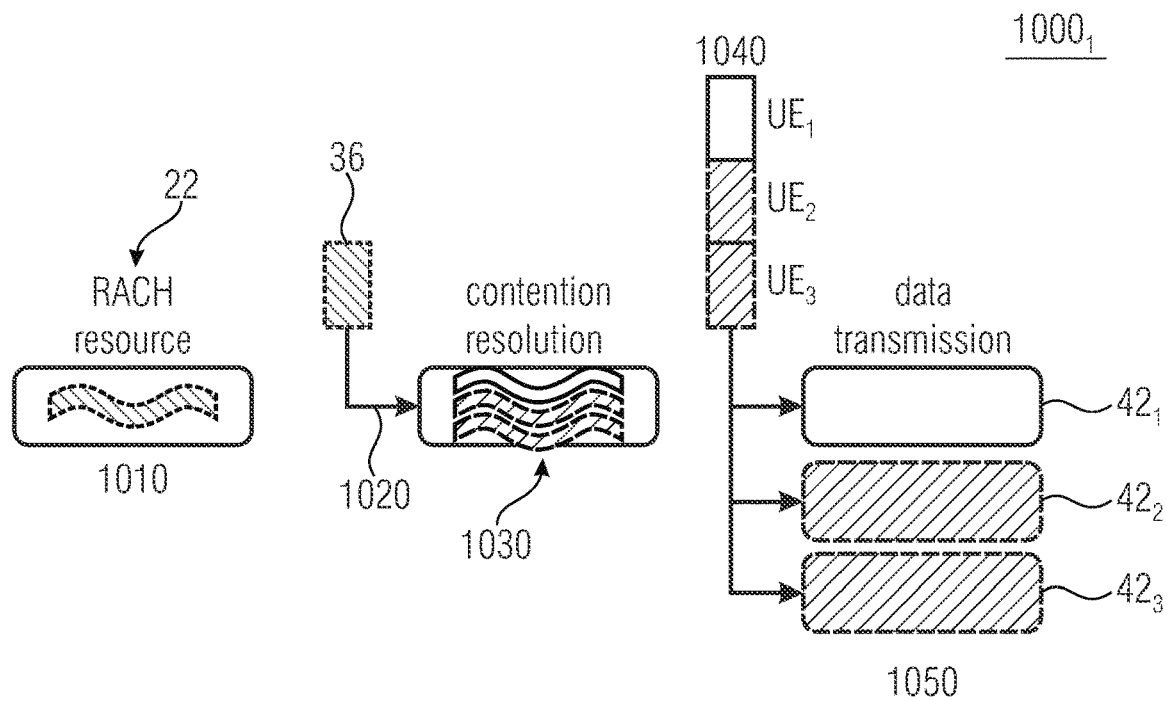
FIG. 10a shows a schematic flowchart of a method for illustrating the use of preambles associated with a message/transmission information and a contention resolution according to an embodiment.

FIG. 10a shows a schematic flowchart of a method 10001 for illustrating the use of preambles associated with a message/transmission information and a contention resolution. In a step 1010 the RACH preamble 22 indicating a certain message group may be recognized, for example, at a base station 36. A contention resolution resource may be signaled or may be preconfigured. The signaling may be performed, for example, by the receiver, e.g., the base station. Such signaling or pre-configuration may be performed, for example, in a step 1020 which may be performed prior or after step 1010. In a step 1030, UEs that were transmitting the initial preamble in step 1010 so as to form a superposition as described in connection with a step 910 may perform an additional contention resolution step

1030. This can be done, for example, by randomly choosing a preamble 32 or using a preconfigured preamble or choosing from a preconfigured pool of preambles. Resources for transmission may be assigned in a step 1040 and the UEs may transmit their messages in a step 1050. That is, the device in accordance with an embodiment may be configured for transmitting a contention resolution signal after transmitting the wireless signal 14 and prior to transmitting the further wireless signal in step 1050, for example, during step 1030. The device may be configured, for example, for receiving scheduling information indicating a scheduled resource of the wireless communication network in step 1040 and for using the scheduled resource for transmitting the wireless signal in step 1050.

Figure 10B:
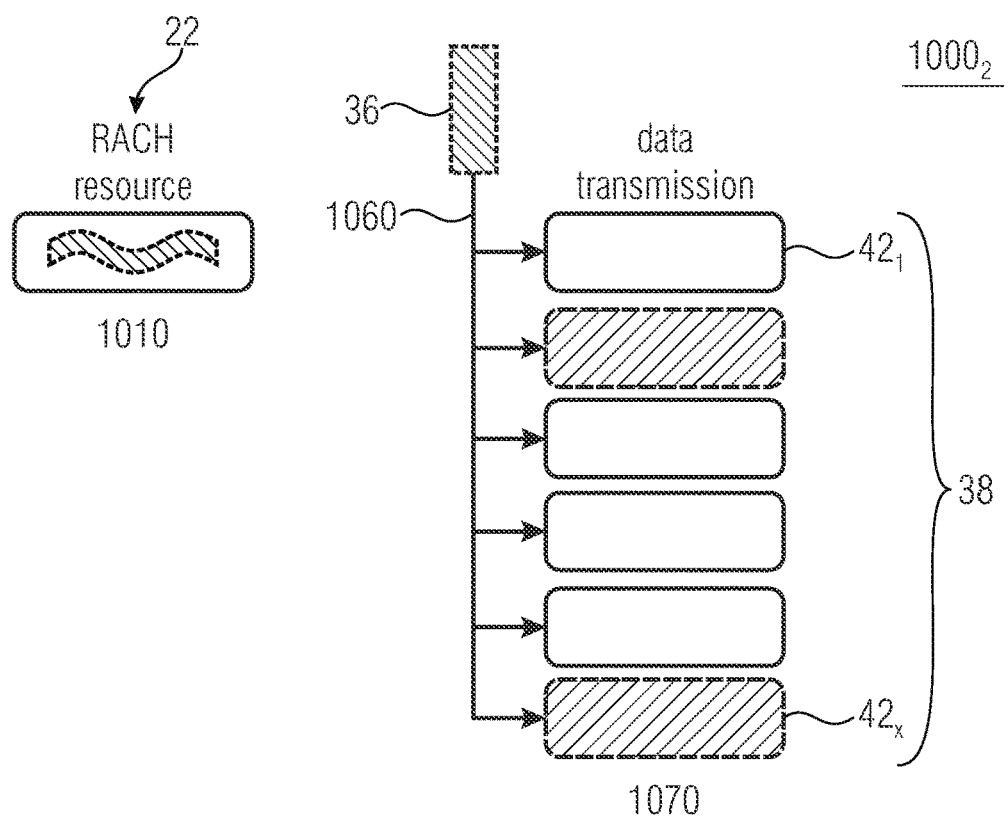
FIG. 10b shows a schematic flow chart of a further procedure according to an embodiment.

FIG. 10*b* shows a schematic flow chart of a further procedure 1000$_2$ according to an embodiment. The RACH preamble 22 indicating a certain message or message group may be recognized as described in connection with step 1010 and the base station 36. A pool 38 of resources 42$_1$ to 42$_x$ may be indicated in a step 1060 or may be preconfigured. The UEs that have sent the random access preamble 22 may choose a subset of the pool 38, i.e., 1 or more resources to transmit their remaining message, i.e., the second wireless signal. That is, the device may use a predetermined resource of the wireless network for transmitting the second wireless signal or may select from the pool 38. In case of a predetermined resource, the predetermine resource may be dedicated to the device within the wireless communication network such that different devices automatically use different resources. Alternatively, the control unit may be configured for selecting the predetermined resource from the pool 38 being a predetermined pool of predetermined resources.

When referring again to FIGS. 8*a* and 8*b*, the transmission of the wireless signal 14 of FIG. 6 may be implemented by use of a resource of a set of predetermined resources which are dedicated for transmitting the wireless signal 14 for a transmission of event-related wireless signals. That is, a specific subset of resources may be reserved, by indication of the base station or as predetermined parameter for the transmission of the wireless signal 14.

Figure 10C:
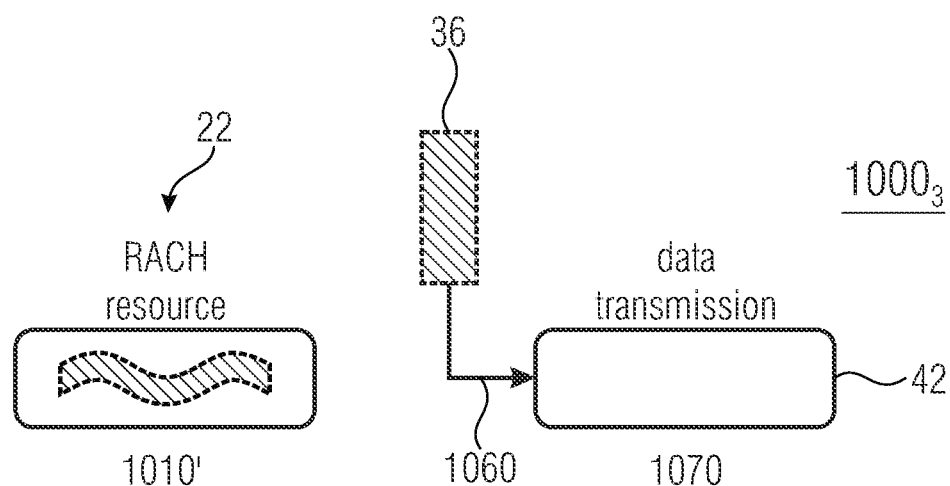
FIG. 10c shows a schematic flow chart of a procedure according to an embodiment, wherein a certain message or message group may be recognized.

FIG. 10*c* shows a schematic flow chart of a procedure 1000$_3$ according to an embodiment. In a step 1010', similarly to the step 1010, the RACH preamble indicating a certain message or message group may be recognized, for example, at the base station 36. A resource 42 for data transmission may be indicated or may be preconfigured may be used for data transmission in the step 1070. The method or procedure 1000$_3$ can be used, for example, if the preamble 22 transmitted in step 1010' was only assigned to one UE or the base station 36 can estimate from the received signal that only one UE was transmitting the preamble. For example, the UE may be instructed so as to use a specific preamble for a specific event such that transmission of the preamble 22 allows for obtaining all useful information. Thereby, a contention resolution may a priory be known as unnecessary as the receiver knows that only one UE has transmitted the preamble 22.

Figure 10D:
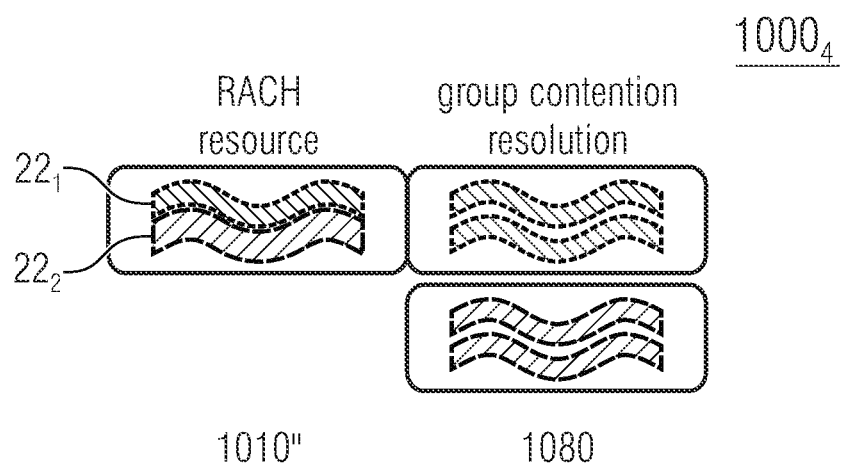
FIG. 10d shows a schematic flow chart of a procedure according to an embodiment, wherein a random access preamble is assigned to a specific device.

FIG. 10*d* shows a schematic flow chart of a procedure 1000$_4$ according to an embodiment. A device implementing the procedure 1000$_4$ may be configured for transmitting the random access preamble 22 of steps 1010 or 1010' by way of example as a first random access preamble 22$_1$ so as to indicate a message clause of the wireless signal 14 or a group of devices to which the device belongs. Seamlessly, without waiting for response, the device may transmit a further random access preamble 22$_2$ for contention resolution so as to identify the user. That is, the preamble 22$_2$ may indicate the user whilst the preamble 22$_1$ may indicate a group of messages or devices. Thereby, the preamble search space may be extended as not only a single preamble as an associated information but also the combination of preambles as some combinations may be allowed and some may be unallowed or unallocated in the network.

The base station 36 may be configured for operating a wireless communication network so as to provide for a random access resource to be used by a device for a random access procedure for transmitting a wireless signal, e.g., the wireless signal 14, having a random access preamble of a plurality of random access preambles. The base station may be configured for associating a random access preamble received with a first wireless signal to an event and/or to a transmission information being reported by the device and for not associating a second random access preamble received with a second wireless signal with the same transmission information, for example, as this preamble has either no association as described in FIG. 8*a* or as being associated to a different transmission information or connected to a different group as described in connection with FIG. 8*b*. The base station may be configured for interpreting the random access preamble at least as part of payload data transmitted by the device, e.g., as part of the message to be transmitted. The base station may be configured for receiving the wireless signal 14, for identifying the transmission information or the associated event based on the random access preamble 22 and for performing contention resolution after having identified the event. That is, the base station may have knowledge about the event before requesting further information.

The random access preamble may be associated with an identifier. The base station may be configured for performing the contention resolution based on a transmission of the identifier so as to initiate a random access procedure of devices having transmitted a wireless signal containing the random access preamble associated with the identifier. The base station may alternatively or in addition be configured for broadcasting information indicating an association of the event with the random access preamble in a system information block of a communication scheme of the wireless communication network. Alternatively, other channels or resources may be used. The base station may be configured for evaluating the random access resource for a first random access preamble indicating a group of devices and for a second random access preamble indicating an identifier of the device as described, for example, in connection with FIG. 10*d*.

Embodiments provide for a service-class orientated RA protocol in the sense that specific (sub-) sets of random-access preambles are defined (reserved) to be used exclusively for specific service-types/classes such as high priority users. A device identification (contention resolution) may then optionally be performed on separate resources in a consecutive step. Thereby, the embodiments describe a concept to exploit (fast-) preamble detection during random-access to be used for data-centric communication where messages ("what happens") have higher priority than the identity of the device ("which device is transmitting"). An inherent feature of embodiments is that if multiple devices select the same preamble from the set of "high-priority" preambles, the detection probability at the base-station increases due to the physical super position of signals.

Embodiments further describe how to define this specific preamble set and how to resolve the contention of multiple devices, once a preamble is detected. Embodiments are described by way of an example in connection with an application using NB-IOT as a base-line technology. However, the embodiments are considered to be general and can be extended to other wireless standards like LTE or 5G-NR (new radio). An example scenario relates to a (local) sensor-network which is deployed in a specific environment (e.g., an industrial facility) to monitor the state of a specific (automation) process based on pre-defined measurement values (e.g., pressure level, temperature or the like). In the regular operation, the sensors gather information locally and transmit it in regular intervals to a base-station with associated fusion center which allows a centralized monitoring/controlling and analytics (machine learning). The sensors may be powered by batteries, hence the wireless transmission protocol needs to be very energy efficient to guarantee a long life-cycle. Further, the number of sensors in such a scenario may be expected to be very large while the operational cost per sensor is typically low with limited low bandwidth-consumption. A known technology for filling such a requirement is NB-IOT which uses narrow band transmissions with very long similar directions in order to simplify the hardware and to keep the cost per device low. Embodiments of the present invention are in particular relevant for situations I), II) and V) of the RACH process situations described above. Embodiments provide for a solution of the draw back that other current random access methods are not designed for low-latency data-centric applications, i.e., time critical (emergency) events are not supported. The reason is that the random access procedure (e.g., NB IOT-based RACH) and the data transmission sequentially separates between 1. device identification and grant assignment; and
2. (payload) message transmission.

This is critical if a large number of devices (sensor 1, sensor 2, . . . ) report (the same) critical event (e.g., "fire"). Then, each device individually needs to connect to the network (PRACH) and transmit individual messages (sensor 1: "fire"; sensor 2: "fire"; . . . ). The generic approach may briefly be described as follows: assuming that the devices are configured to use a specific set of the preamble set for high priority messages and a regular preamble-space/set for regular RA, it is possible to:

1. Devices send (grant-free) alarm messages using the predefined set of preambles defined by the respective service class (RACH);
2. the BS detects alarm/messages based on preamble detection, possibly not knowing identity or number of users. The BS may request devices (which send alarm messages) to transmit additional information to identify UEs and further information (e.g., position/temperature/$CO_2$/ . . . ). Thus, the BS may initiate contention resolution using the following options;
   a. grant assignment; the BS may assign specific grants for one or more groups of devices by using the preamble ID as identifier to address the group as described in connection with FIG. 10a;
   b. pre-defined resources per service class; the BS may pre-configure resources for the specific service class as described in connection with FIG. 10b;
   c. assign UEs to use legacy RA as indicated in FIG. 10c.
3. Devices may send further information on granted resources.

Resource allocation and signaling for NB-IOT may be performed such that the eNB provides the NPRACH configuration for each coverage level in the SIB (where the preamble settings are defined). Thus, embodiments proposed to define a new "preamble/message" class in the SIB such that all sensors find information how to configure the preambles reserved for message transmission. That is, embodiments provide for a base station being configured to provide the SIB so as to indicate at least one subset of preambles of the set of available preambles that are allocated to transmission information. Additional information may be used and provided how to map the message preambles to the physical resources. This can be done on a separate (physical) channel (an exclusive set of physical resources reserved for a message-preamble transmission) or as part of the regular NPRACH, where a specific subset of preambles is reserved as shown in FIG. 8a. Details in connection herewith are:

Dedicated Message Channel: in this setting, exclusive resources may be specified where message preambles are transmitted. This can be allocated in a semi-persistent fashion.

Coexistence with legacy NPRACH: a subset of the preambles from the legacy NPRACH may be reserved for message-preambles as described in connection with FIG. 8a and FIG. 8b.

No dedicated resources: in this case, specific preamble IEs are used for message transmission (configured by higher layer) but collisions can occur if "other" devices select the same preamble ID which lead to high force-alarm rate but for a simple structure.

Embodiments described herein relate to a contention resolution, e.g., to identify single users even if they have transmitted using a same resource.

FIG. 11 shows a schematic block diagram of a wireless communication network 115 according to an embodiment which may be based on the structure of network 100 and which may have a base station 44 which may be the base station 36 and which may, optionally, be configured to support random access preambles being associated with transmission information. In known networks, transmission of signals $46_1$ and $46_2$ of devices $48_1$, $48_2$ respectively are synchronized so as to arrive at a same time $t_R$ at the base station 44. Due to different channel conditions or distances between the devices $48_1$ and $48_2$ and the base station 44, different times of travel $\Delta t_1$, $\Delta t_2$ respectively may be used to transport the messages/signals $46_1$ and $46_2$ to the base station 44. By use of mechanisms such as Time-Alignment (Offset) or Timing Advance, a begin of transmission may be adjusted so as to compensate for the different times of travel $\Delta t_1$ and $\Delta t_2$. It is noted that any other number of devices and/or base stations may occur in example networks and that the explanations given is for exploratory reasons only.

As described, for example, in connection with FIG. 9, FIG. 10a, FIG. 10b or FIG. 10d, a device in accordance with an embodiment, for example, the device 48 and/or 60 may be configured for transmitting a first and a second wireless signal, wherein the wireless signal is transmitted subsequent to the first wireless signal. The first wireless signal may be, for example, the wireless signal 14 of FIG. 6. The device $48_1$ and/or $48_2$ may be configured for departing from the synchronization scheme. For example, it may send the wireless signal 14 or the wireless signal so as to perform contention resolution unsynchronized with the base station. Unsynchronized may mean, that a compensation for the timing offset is simply not performed. Alternatively, an individualized timing may be implemented, i.e., a timing offset TA may be selected, for example, by the device, e.g., by random or according to a rule or by the base station, e.g., by random or according to a rule, such that different times of arrival appear at the base station, wherein the time of arrival is related to an information in connection with the device so as to allow identification of the device. The respective other signal may be transmitted, for example, in a synchronized manner. According to a different embodiment, the device may be configured for transmitting both, the wireless signal 14 and the wireless signal for contention resolution unsynchronized with the base station or with an individualized timing at the base station.

In case both signals are sent unsynchronized or with an individualized timing at the base station, the timing offset may be same or may be different between both signals sent by the device.

Further, such an individualized timing may allow for implementing a further degree of prioritizing messages or by indicating a requested QoS. For example, the device selecting its individual timing may select for a lower delay when having a message of higher priority or higher QoS.

Figure 3:
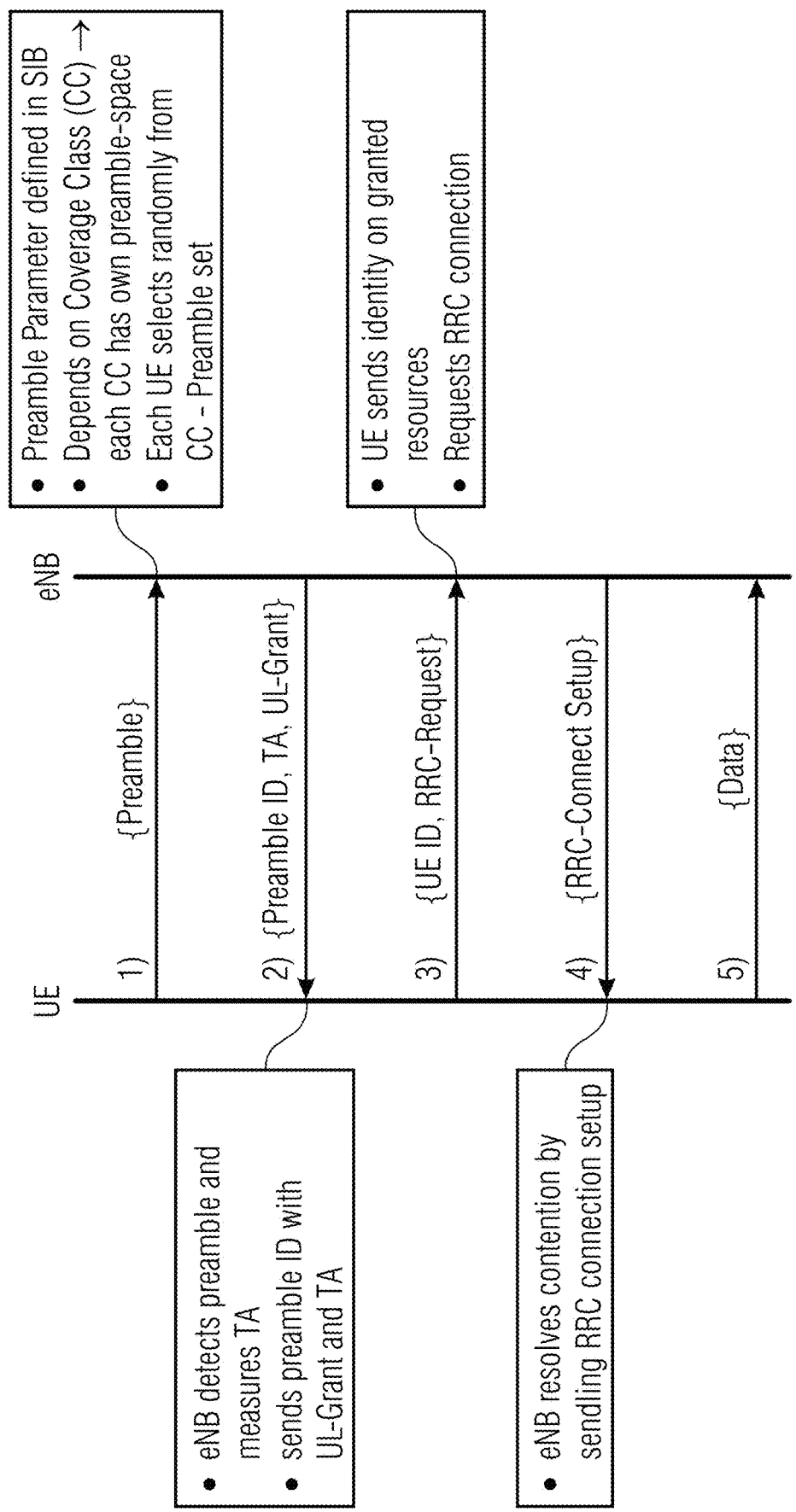
FIG. 3 shows a schematic flowchart of a known random access procedure for NB-IOT devices.

The embodiment for partially or completely deviating from the synchronization may be implemented together with or independent from the RA preambles associated with transmission information. For example, when considering a legacy RACH, the individual timing may be applied to the regular preamble transmission and/or the transmission performed under 3) in FIG. 3.

The base station 44 may be configured for operating the wireless communication network 110 such that a device communicating in the wireless communication network compensates for a timing offset based on a channel delay $\Delta t$ so as to synchronize with the base station. This may relate to a synchronization along multiple devices. The base station may be configured for controlling the device so as to transmit a wireless signal for contention resolution unsynchronized with the base station or with an individualized timing at the base station. This signal may be the wireless signal 14 and/or the subsequently transmitted signal.

Although embodiments relate to a same meaning, i.e., a same transmission information, of a preamble for different devices, according to an embodiment, different devices 48$_1$ and 48$_2$ may be adapted to use different sets of preambles or may be adapted, for example, to use a same preamble differently. That is, a same preamble may have a first meaning (related to a first transmission information) at a first device 48$_1$ and being associated to a different second transmission information at the second device 48$_2$ or, alternatively, to no transmission information.

For example, a specific preamble may be associated with a first transmission information (e.g., "fire") in connection with a first device and with a second different transmission information (e.g., "low pressure") in connection with a second device. The respective different meanings may be associated or managed, at a centralized entity, e.g., the base station, or differently as described previously. A base station may be adapted to differentiate between the first and the second device 48$_1$ and 48$_2$, for example based on a contention resolution mechanism or a side channel information or a different mechanism such as individual timing offsets. That is, the base station may be configured to differentiate between transmitters of the preamble and may interpret the preamble based on the transmitter and thus differently dependent from the transmitter.

A method in accordance with an embodiment which may be used for operating a device adapted for communicating in a wireless communication network to transmit transmission information by transmitting a wireless signal in a Random Access Channel of the wireless communication network comprises: selecting the random access preamble such that the random access preamble is associated with the transmission information. The method further comprises providing the wireless signal so as to comprise the random access preamble and transmitting the wireless signal.

A further method for operating a wireless device adapted for communicating in a wireless communication network by transmitting a wireless signal, the wireless communication network operated by a base station by use of a synchronization at the base station, comprises: transmitting, with a wireless interface, a first wireless signal synchronized with the base station so as to have a predetermined timing at the base station. The method comprises transmitting a second wireless signal associated with contention resolution, e.g., the wireless signal 14 and/or a subsequent signal, so as to be unsynchronized with the base station or so as to have an individualized timing at the base station.

A method for operating a base station adapted for operating a wireless communication network so as to provide for a random access resource to be used by a device for a random access procedure for transmitting a wireless signal having a random access preamble of a plurality of random access preambles comprises: associating a random access preamble received with a first wireless signal to a transmission information report by the device and for not associating a second random access preamble received with a second wireless signal with the transmission information.

A method for operating a base station adapted for operating a wireless communication network according to an embodiment comprises: operating the wireless communication network such that a device communicating in the wireless communication network compensates for a timing offset based on a channel delay so as to synchronize with the base station. The method comprises controlling the device so as to transmit a wireless signal for contention resolution unsynchronized with the base station or with an individualized timing at the base station.

Figure 12B:
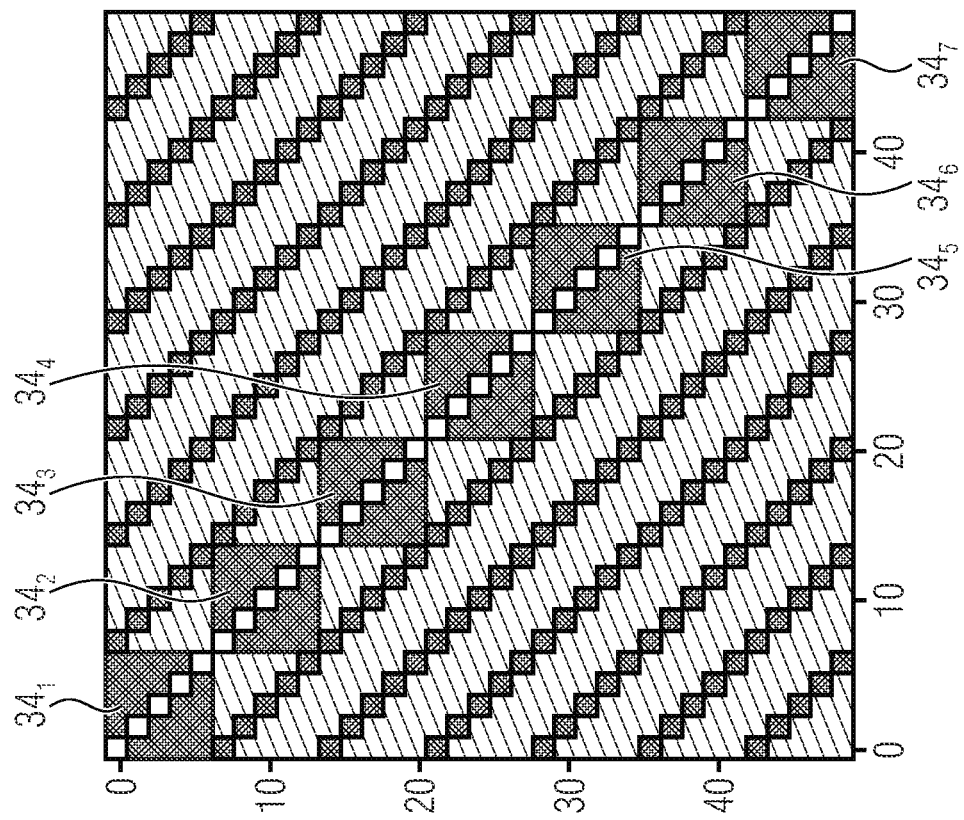
FIG. 12b shows an example covariance matrix of an example signature matrix with seven orthogonal subgroups of preambles according to an embodiment.
Figure 12A:
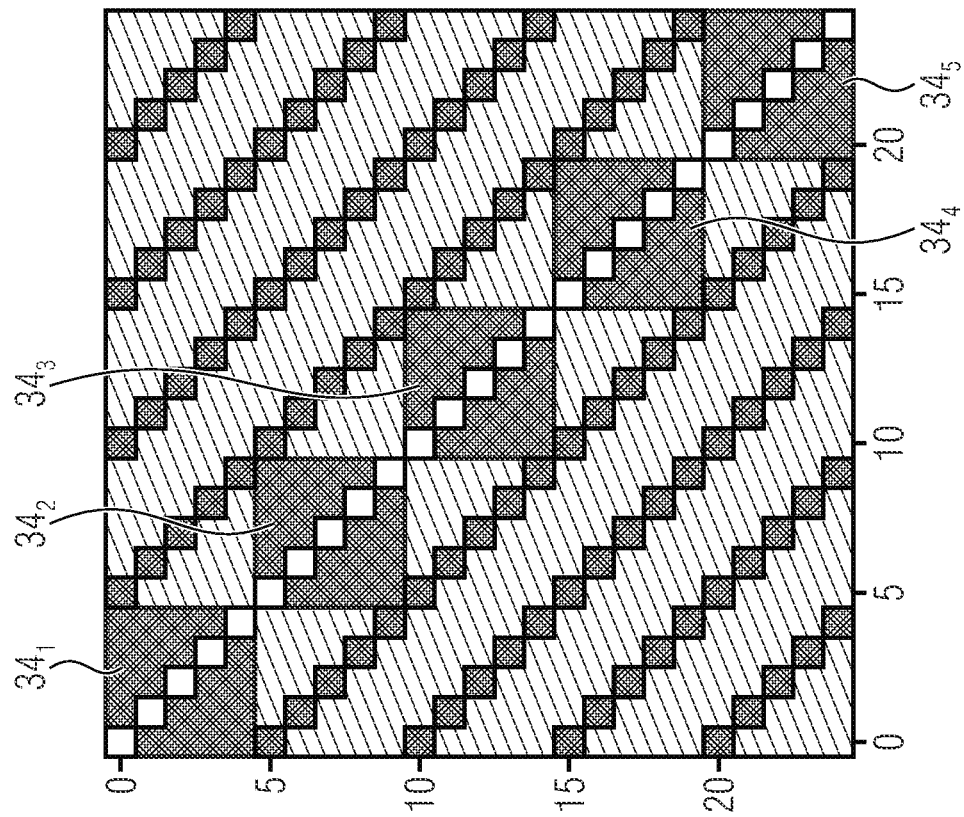
FIG. 12a shows a covariance matrix of example signature matrix with five orthogonal subgroups of preambles according to an embodiment.

FIG. 12*a* shows a covariance matrix of example signature matrix with five orthogonal subgroups of preambles. FIG. 12*b* shows an example covariance matrix of an example signature matrix with seven orthogonal subgroups of preambles. The signature may be adapted in view of autocorrelation properties so as to have good autocorrelation properties. Embodiments proposed for a specific design which additionally provides "orthogonal" subgroups. This allows an efficient "overload" of the system (more messages can be defined even when signature length is limited). Further, each of the groups can be assigned a) to a specific set of messages (e.g., group 1: related to fire, group 2 related to pressure, . . . ) or to a specific spatial cluster (e.g., group 1 is related to all sensors of cluster 1, group 2 has the same message but related to all sensors in cluster 2, . . . ). An example of such a signature construction is given by the Euler-square construction of the messages. In FIGS. 12*a* and 12*b*, the covariance matrix is depicted, where the diagonal elements represented the auto-correlation and the dark squares along the main diagonal represent the orthogonal subgroups. Note that both signature sets are non-orthogonal in the sense that there are "more sequences" (i.e., messages) than resources (i.e., sequence length).

Embodiments allow for a reduced latency for (mission) critical applications in low-power sensor networks and/or for an increased detection probability if multiple sensors have the same message.

Figure 13:
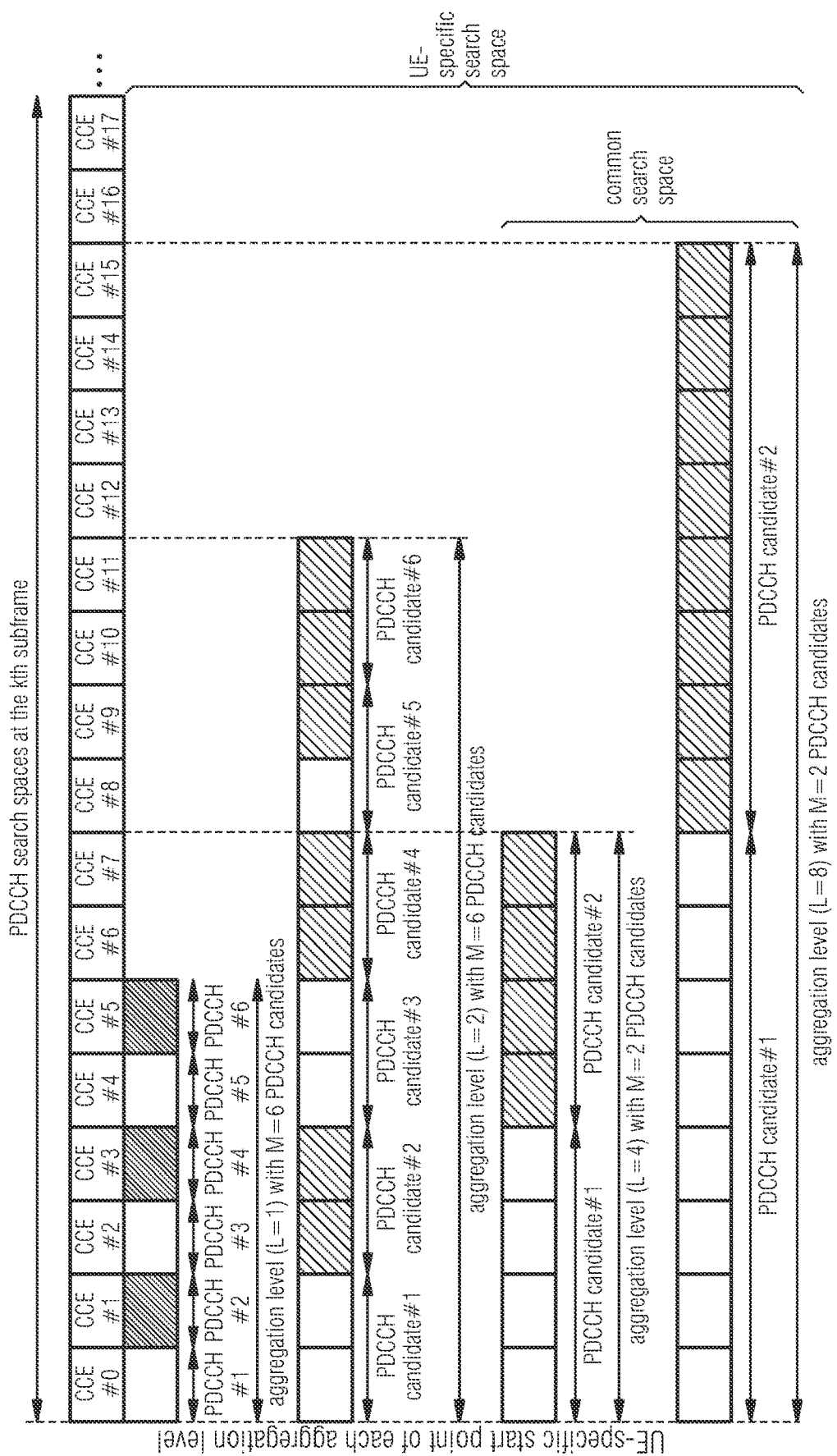
FIG. 13 schematically illustrates an example of a PDCCH region having a plurality of PDCCHs formed of different numbers of control-channel elements, CCEs.

In connection with the Euler square construction of messages, further explanation is given below:

A downlink, DL, radio frame in a wireless communication network includes a PDCCH region which defines the locations or places where a specific PDCCH may be located. The PDCCH region is searched by the UEs. Each PDCCH carries a control message, like the downlink control information, DCI, package which is identified by the UE-specific radio network temporary identifier RNTI. The RNTI is encoded, for example, in the CRC attachment of the DCI. The DCI may be scrambled with the UE-specific RNTI, like the C-RNTI. FIG. 13 schematically illustrates an example of a PDCCH region having a plurality of PDCCHs formed of different numbers of control-channel elements, CCEs. Depending on the payload size of the DCI format to be transmitted and the channel conditions, the base station may select an appropriate aggregation level defining the number of CCEs to be used for transmitting the DCI packet. As can be seen from FIG. 13, the PDCCH search space is divided into a common search space, that may be monitored by all UEs which are served by a base station, and into a UE-specific search space that is monitored by at least one UE. Each UE performs a blind decoding on the whole PDCCH region so as to find one or more DCI packets dedicated for this UE. The DCI packets indicate, for example, the resources and other parameters to be used during an upcoming data transmission.

Figure 14:
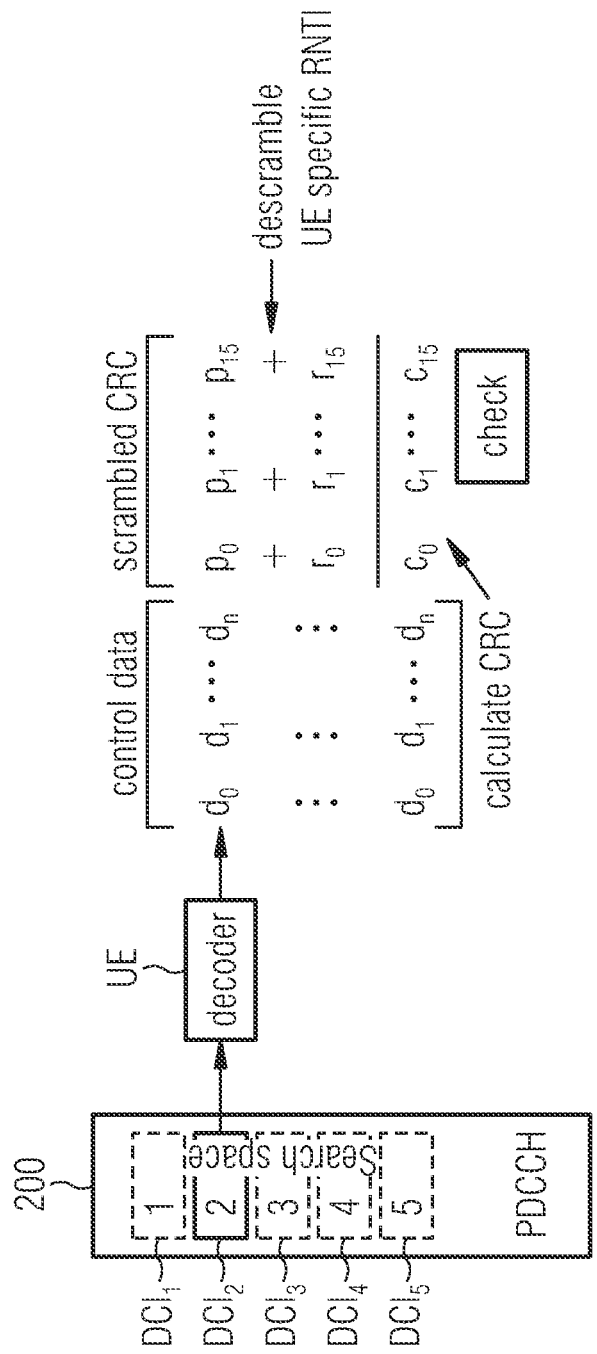
FIG. 14 schematically illustrates the blind decoding process to find within the PDCCH region one or more DCI packages for a specific UE.

As mentioned above, a UE may obtain its one or more DCI packages by searching the PDCCH region which includes a blind decoding/blind detection approach. FIG. 14 schematically illustrates the blind decoding process to find within the PDCCH region one or more DCI packages for a specific UE. FIG. 14 schematically illustrates the PDCCH region 210, also referred to as the PDCCH search space. Five DCI packages $DCI_1$ to $DCI_5$ are illustrated in the PDCCH search space 210, and a specific UE including an appropriate decoder searches the PDCCH search space 210 for a valid CRC to find DCI packets for this specific UE. As it is depicted in FIG. 14, the convolutional decoder obtains from DCI package $DCI_2$ the data including the control data and the scrambled CRC. The control data and the scrambled CRC are separated, the scrambled CRC is descrambled using the UE specific RNTI, the resulting CRC is checked against the CRC calculated from the control data, and a match of the resulting CRC and the calculated CRC indicates that the DCI package $DCI_2$ is actually the control message for the UE which decoded the control message.

However, the blind decoding approach described above may also find a match due to random data in the PDCCH search space, i.e., data not representing a DCI message for the specific UE may be erroneously detected as a valid control message, also referred to as a false-positive DCI. Such a false decoding may occur with a probability of $P_{FA}=M\times2^{-16}$, where M is the number of blind detection attempts carried out by the UE. For example, in wireless communication systems as described above the probability for such a false alarm rate may about $10^{-5}$ (see e.g., 3GPP TDOC R1-1719503: Design Impact on Reliability for LTE URLLC). In other words, when a control messages decoded from a control region of a radio signal by a receiver, like a UE, may be decoded erroneously, i.e., is actually not a control message for this UE, with a probability about $10^{-6}$. Basically, this is not a problem for standard or regular communication services. However, ultra-reliable communication services may involve a probability for a packet error to be around $10^{-6}$ so that a false-positive DCI detected with a probability of about $10^{-6}$ a problem as the UE, on the basis of the false-positive DCI, which may be a control message for another UE, causes the UE to configure itself for a data transmission on resources where no data for the UE is received so that the data transmission towards the UE may not be successful. This may lead to an additional delay until the UE, for example, in a subsequent downlink frame, decodes a correct or true-positive DCI allowing the UE to set its parameters for receiving data from the base station on the correct resources. Clearly, while such a delay might not be an issue in conventional or standard communication services, in services requiring an ultra-reliable communication such decoding/detection of false-positive control messages may increase the delay.

To allow for a concept implementing a reliable communication, which additionally allows for a high throughput, a user equipment (UE) being configured for operating in the wireless network, the network utilizing a first number of resources for serving communicating UEs, comprises a wireless interface for communicating in the wireless network. Communicating refers to a transmission process and/or a reception process. The UE comprises a controller configured for selecting, for communicating in the wireless network, from a second number of predefined subsets of the first number of resources, at least one subset of resources. The second number is larger than the first number. The second number of predefined subsets is based on a mapping of the first number of resources into the second number of subsets using an Euler-square mapping. The Euler-square mapping allows for a scenario in which each resource is used by at least a first and a second subset therefore rendering the subsets as non-orthogonal. In accordance with the signature-based approach, the pattern of resource elements contained in each of the subset may be unique in a common resource map such that a transmitter and/or receiver may be identified by identifying the pattern of resource elements.

In connection with embodiments described herein, resources may refer to a single or to a multitude or to a plurality of resources usable in a wireless communication network, amongst which there are time, frequency, transmission power, space and code. For example, a resource may be a single sub-carrier (frequency domain) used for a specific time (time domain). For example, a resource may also be an aggregation of such resources, for example, aggregated to a fading block containing a set of resources being considered to provide for a homogeneous channel fading. For example, a resource may comprise a code being used for a specific time and/or frequency slot. Thus, also the fading blocks may be considered as resources. A specific type of resource and/or an amount thereof, e.g., a number of sub-carriers and/or time slots aggregated in a fading block may thus vary dependent on a granulation of the wireless network. In connection with the embodiments described herein, a resource element is considered as a fading block, wherein other implementations are possible, without any limitation.

Non-orthogonal multiple-access (NOMA) is a main enabler of the new radio (NR) design of 5G cellular networks and beyond. The underlying idea is to loosen the paradigm of orthogonal transmissions by allowing different users (or layers) to concurrently share the same physical resources, in either time, frequency or space or code or transmission power. Consequently, more connections can be supported in massive Machine-Type-Communications (mMTC), or alternatively, a higher throughput can be achieved in enhanced Mobile Broadband (eMBB) scenarios. Given the current spectral constraints, radio access techniques may be used where the User Equipments (UEs) share the wireless resources in a non-orthogonal fashion, be it in the initial access phase or the data transmission phase (or both, as in the case of a joint initial access and data transmission scheme). Examples include the concept of non-orthogonal multiple-access (NOMA), which relies on power-domain or code-domain multiplexing, with corresponding schemes including power-domain NOMA, multiple-access with low-density spreading, sparse code multiple-access, multi-user shared access, pattern division multiple access, to name a few. Other examples are the communications schemes where the UEs simultaneously perform initial access and communicate information to a joint receiver by transmitting non-orthogonal information-bearing sequences over a block of shared channel resources (time-frequency slots). The concept generalizes two multiplexing layers across shared resources, where different layers may correspond to different users, but also to the same user multiplexing messages over the same resources as, e.g., in broadcast or multicast scenarios. An important aspect of non-orthogonal multiple access is the code design, i.e., the predefined structure according to which the information-carrying messages of the individual layers are mapped to the shared resources.

The plethora of NOMA techniques can be roughly categorized into two main classes: signature-domain multiplexing and power-domain multiplexing. In the latter class, signals corresponding to different users are superimposed, and commonly decoded via successive interference cancellation (SIC). Signature-domain multiplexing is based on distinguishing spreading codes, or interleaver sequences (concatenated with low-rate error-correcting codes). Low-density code-domain (LDCD) NOMA is a prominent sub-category of signature-based multiplexing, which relies on low-density signatures (LDS) as described in [3]. Sparse spreading codes comprising a small number of non-zero elements are employed for linearly modulating each user's symbols over shared physical resources. Significant receiver complexity reduction can be achieved by utilizing message-passing algorithms (MPAs), which enable user separation even when the received powers are comparable (as opposed to power-domain NOMA). Different variants of LDCD-NOMA have gained much attention in 5G 3GPP standardization. For instance, Sparse-Code Multiple-Access (SCMA) as described in [4] and [5] further optimize the low-density sequences to achieve shaping and coding gains by using multidimensional constellations. The sparse mapping between users and resources in LDCD-NOMA can be either regular, where each users occupies a fixed number of resources, and each resource is used by a fixed number of users; or irregular, where the respective numbers are at random, and only fixed on average. The optimal spectral efficiency of irregular LCDC-NOMA is investigated in [6], and shown to result the below the well-known spectral efficiency of dense random-spreading (RS), as described in [7]. The result stems from the random nature of the user-resource mapping, due to which some users may end up without any designated resources, while some resources may be left unused. On the other hand, regular user-resource mappings have shown potential benefits, as addressed in [8].

Figure 15:
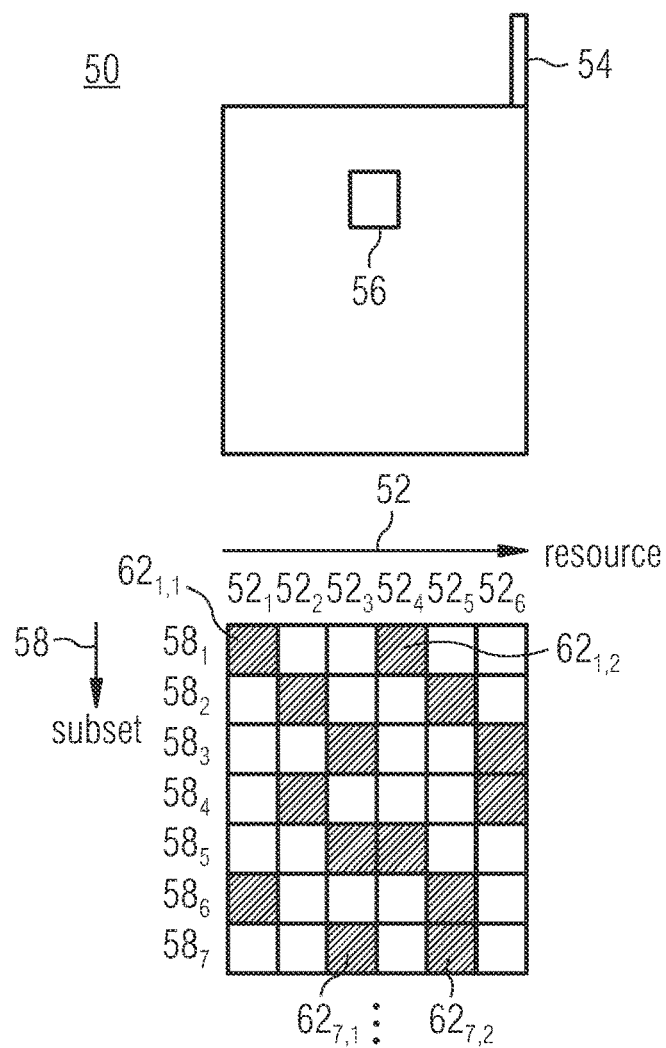
FIG. 15 shows a schematic block diagram of a user equipment according to an embodiment.

FIG. 15 shows a schematic block diagram of a user equipment 50 according to an embodiment which may be in accordance with UE 60. The user equipment 50 may be configured for operating in a wireless network, for example, in the wireless network 100 or 150. By way of example, the network may utilize a number of resources 52, the resources 52 comprising one or more of at least a code, a time, a frequency and/or a space as described above.

The user equipment 50 may comprise a wireless interface 54, such as an antenna arrangement comprising at least one antenna, for communicating in the wireless network. The user equipment may be configured for performing beamforming or similar features with the wireless interface but is not required to do so. The user equipment may further comprise a controller 56 configured for selecting at least one subset 58 of resources 52 from a number of predefined subsets. The predefined subsets 58 may be known to the user equipment 50 prior to the start of data exchange. For example, the predefined subsets may be known by way of exchanging information via broadcast channels. Alternatively or in addition such information may be stored in a memory and may be accessible for the controller 56 so as to be in conformity with a communication standard or the like. The predefined subsets 58 may be a fixed or a variable information.

The example resource table shows resources $52_1$ to $52_6$ and their allocation or association to the subsets $58_1$ to $58_7$. The number of subsets $58_1$ to $58_7$ is larger when compared to the number of resources $52_1$ to $52_6$, i.e., at least one resource 52 is used in more than one subset 58 rendering the subsets 58 as non-orthogonal. As will be described in more detail in the following, the pattern of association of the resources 52 to the subsets 58 is implemented according to an Euler-square pattern.

Hatched resources $62_{i,j}$ from the resources 52 indicate the respective association, wherein index i indicates the subset to which the respective resource is associated and the index j indicates a counter counting of the number of resources in the associated subset. For example, the resource $62_{1,1}$ is the first resource of the first subset, where in the resource $62_{7,2}$ is the second resource of the seventh subset.

By using Euler squares, distinct patterns of used resources may be obtained, the distinct patters allowing for a signature-based multiplexing. Embodiments therefore relate to a general form of signature-based multiplexing according to which, after the synchronous layer-multiplexing, the received signal matrix $Y^{(q)}$ over the fading block FB q (i.e. over the nc=ns·no resource elements within the block) can be expressed as $$Y^{(q)} = \sum_{j=1}^{J} \lambda_j h_j^{(q)} \mathrm{diag}(f_j^{(q)}) X_j^{(q)} + W^{(q)}, q = 1, \ldots, Q$$

where $\lambda_j \in \{0, 1\}$ is a random binary variable denoting user activity (layer presence) in the resource frame, the ns·no matrix $X_j^{(q)}$ represents the signal of user/layer j (when active/present) sent over the nc=ns*no resource elements in the FB q; $f_j^{(q)}$ is the ns-dimensional signature vector associated with user j in FB q, describing the mapping of the transmit signal on the ns subcarriers; $h_j^{(q)}$ is the fading coefficient of user/layer j and $W^{(q)}$ is the additive noise matrix at the receiver. It is important to note that the assembling of the time-frequency slots in fading blocks experiencing the same channel conditions (i.e. the same channel realization) provides certain flexibility in the construction of the transmit code words due to the symmetry between the frequency and the time dimension within one fading block. This, for example can be used to trade bandwidth with latency requirements (and vice versa).

A signal construction, i.e., determining patters used in the resource map may be based on the consideration that the overall performance of NOMA transmission schemes with sparse signatures may at least be influenced on the construction of the signatures associated with the individual users (layers), which may be assembled in the matrix $$F = \begin{pmatrix} F^{(1)} \\ \vdots \\ F^{(Q)} \end{pmatrix}$$

where $F^{(q)}$ stacks the signature vectors of the J users within the q-th FB, $F^{(q)} = (f_1^{(q)} \ldots f_J^{(q)})$. Embodiments propose a signature-based flexible construction for NOMA based on the concept of Euler Squares [9].

Euler squares allow for a high or wide spreading of the used resources amongst all of the resources obtained. Some of the constraints with respect to Euler squares are defined by An Euler square of order n, degree k and index n,k is a square array of $n^2$ k-ads (k-ad denotes a set of k elements) of numbers, $(a_{ij1}, a_{ij2}, \ldots, a_{ijk})$, where $a_{ijr} \in \{0, 1, 2, \ldots, n-1\}$; $r=1, 2, \ldots k$; $i, j=1, 2, \ldots, n$; $n > k$; $a_{ipr} \neq a_{iqr}$ and $a_{pjr} \neq a_{qjr}$ for $p \neq q$ and $(a_{ijr}+1)(a_{ijs}+1) \neq (a_{pqr}+1)(a_{pqs}+1)$ for $i \neq p$ and $j \neq q$. Explicit constructions of Euler Squares are known to exist for the following cases [9]

1) Index p, p−1, where p is a prime number;
2) Index $p^r$, $p^r-1$ for p being a prime number;
3) Index n, k where $n = 2^r p_1^{r_1} p_2^{r_2} \ldots p_l^{r_l}$ for-distinct odd primes $p_1, p_2, \ldots, p_l$. Here, $k+1 = \min\{2^r p_1^{r_1} p_2^{r_2} \ldots p_l^{r_l}\}$.

Furthermore, the existence of the Euler Square of index n, k implies that the Euler Square of index n, k' also exists, where $k' < k$.

Based on these insights, for $n \geq 3$, $k \geq 2$, the matrix F of size $n \cdot k \times n^2$ is constructed as follows: For $1 \leq i \leq n \cdot k$, $1 \leq j \leq n^2$.

$$f_{ij} = \begin{cases} 1 & \text{if } (a_j)_{\lfloor \frac{i-1}{n} \rfloor + 1} \equiv i - 1 \pmod{n} \\ 0 & \text{otherwise} \end{cases}$$

where $(a_j)$ is the j-th k-ad, $(a_j)_l$ is the l-th element in the j-th k-ad, $\lfloor x \rfloor$ denotes the largest integer not greater than x, and mod denotes the modulo operation. With this construction, the j-th signature associated with user (layer) $j=1, 2, \ldots, n^2$ (the j-th column of F) is generated as an nk-binary vector from the j-th k-ad $(a_j)$ with 1 occurring at the positions $(l-1)n+((a_j)_l+1)$ for $l=1, 2, \ldots, k$.

The matrix F is effectively a block matrix consisting of k number of $n \times n^2$ blocks, where there are exactly k ones in each column of F. Each of the users' (layers') signatures (columns of F) correspond to a k-ad (set of k elements) in the Euler Square of index n; k.

The Euler square mapping is thus representable as a matrix having a structure F(n, k), in which $n \cdot k$ is the first number of resources and in which $n^2$ is the second number of subsets. The matrix F is structured so as to comprise a number of k entries indicating a use of resource elements in each of row and so as to comprise n entries indicating a use of resource elements in each column.

Figure 16A:
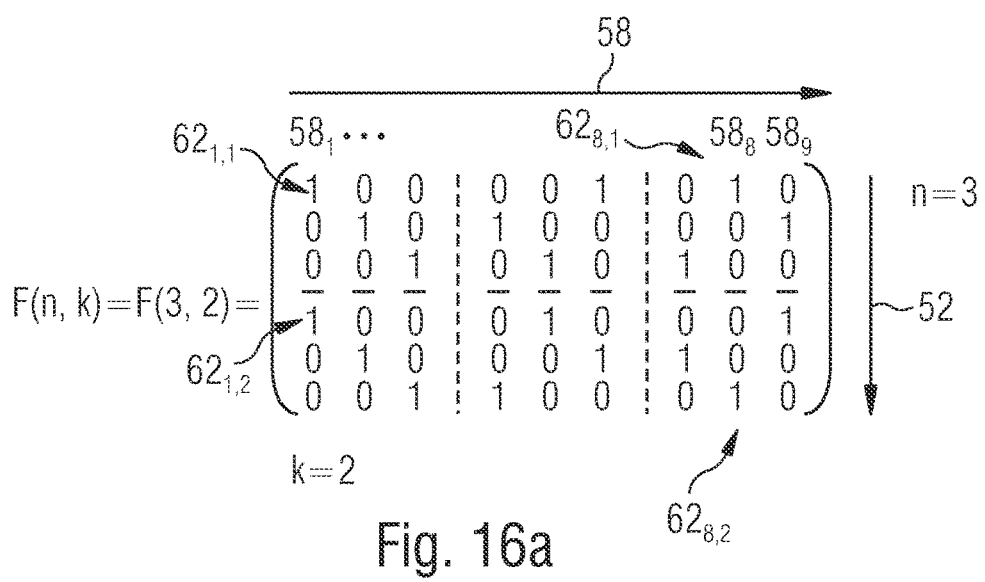
FIG. 16a shows an example Euler-square matrix illustrating resource allocation for an Euler-square matrix of form F(3,2) for resource allocation according to an embodiment.

FIG. 16a shows an example Euler-square matrix for $n=3$ and $k=2$ yielding a matrix having nine columns and six lines.

Parameters $n=3$ and $k=2$ yield in a number of $n \cdot k = 6$ resources to be allocated and $3^2 = 9$ subsets to be obtained. As shown in FIG. 16a, the nine subsets each comprise two associated resource elements 62, i.e., the six resource elements 52 may be used by nine layers or users. As described in connection with FIG. 15, each user, user equipment or application may select more than one subset 58 for communication so as to increase bandwidth and/or reliability of communication.

The matrix F may allow, over all subsets, a high or even maximum spreading which is of benefit for enhancing communication of all layers or users because scenarios may be reduced or even avoided in which some subsets face a high beneficial spreading and others probably fully overlap so as to have no spreading which may lead in high error rates.

Although the resources of a first subset, e.g., resources $62_{1,1}$ and $62_{1,2}$ of subset $58_1$ and resources $62_{8,1}$ and $62_{8,2}$ of subset $58_8$ may be non-orthogonal with respect to each other, based on the different signatures of both subsets $58_1$ to $58_2$ in the resource map, both subsets may be distinguishable.

The patterns of resources, i.e., the used resources, may be regarded as a kind of code or signature allowing for distinguishing between different users. According to embodiments, the wireless network is operated as an OFDM-network. The generated code included in the subsets 58 defines how users use their resources. Based on the regular constructions, a number of overlappings between the resource subsets is limited and, additionally limits the number of resource elements used by each user. Further, the construction rules of Euler square mappings allow for a reconstruction and/or a constraint for solving separation of overlapping users.

Figure 16B:
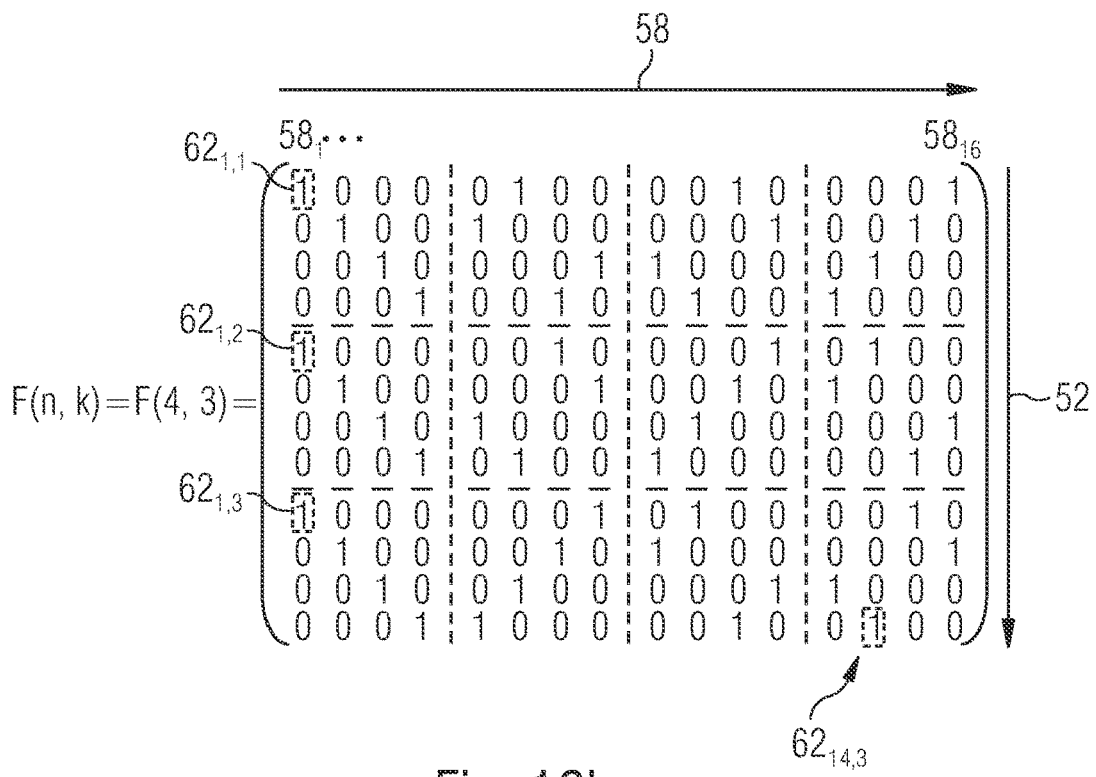
FIG. 16b shows a schematic representation of an Euler-square matrix of form F(4, 3) for resource allocation according to an embodiment.

FIG. 16b shows a schematic representation of an Euler-square matrix having parameters $n=4$ and $k=3$, i.e., F(4, 3). The matrix yields in $4 \cdot 3$ resources to be allocated amongst $4^2 = 16$ subsets, wherein each subset $58_1$ to $58_{16}$ utilizes three resources 52. Providing the subsets 58 so as to comprise a common and equal value of used resources, e.g., two in FIG. 16a or three in FIG. 16b, according to embodiments, different subsets may utilize different numbers of resources.

Figure 16C:
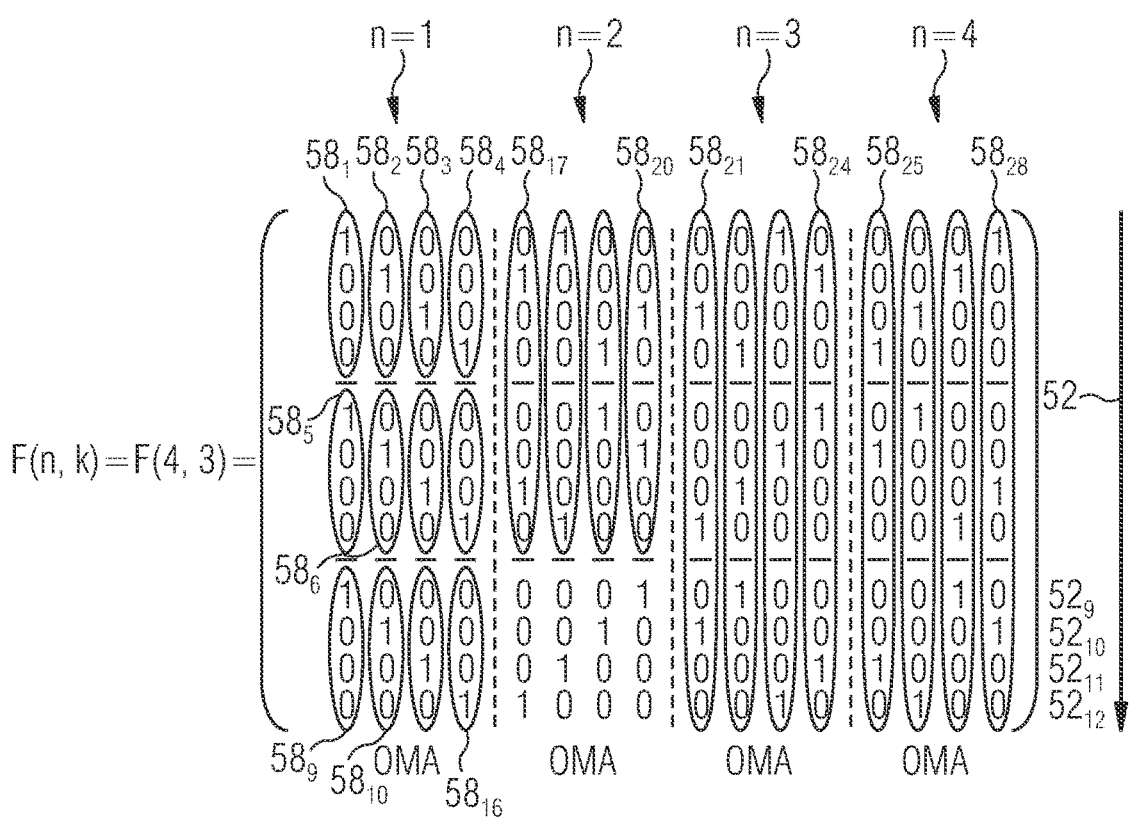
FIG. 16c shows an allocation of the resources of FIG. 6b to resource subsets having varying lengths, according to an embodiment.

As illustrated in FIG. 16c, showing a different generation of subsets $58_1$ to $58_{28}$ from the Euler-square matrix F(4, 3), being the same matrix when compared to FIG. 16b. In contrast to FIG. 16b in which a complete row is taken as representation of resource elements to be used within subsets 58 of equal size, according to FIG. 16c, subsets $58_1$ to $58_{28}$ of different length, i.e., number of resources to be used, may be used. When thus compared to FIG. 16a and FIG. 16 in which a complete column (based on the representation, also a line may be used) of the matrix F represents a subset 58 of resources 52, according to FIG. 16c, in sections of the matrix (n=1) and (n=2) only a part thereof may be used, wherein the columns (or lines) may be used so as to form more than one subset (n=1) and/or so as to define part of the column unused (n=2). Thus, based on a same Euler-square matrix, different concepts of deriving subsets of resources fall under the scope of embodiments. According to an embodiment, each column (or line) of the Euler-square matrix completely forms a subset. According to an embodiment at least one column is divided into sections, each section forming a subset (n=1). According to an embodiment, each column (or line) of the Euler-square matrix forms incompletely a subset (n=1 and n=2), i.e., a part of the column is unused by the subset and/or by different subsets. Although FIG. 16c is illustrated as hybrid embodiment according to which different sections/precoders are implemented so as to use or derive the subsets from the Euler-square matrix differently by way of three different construction rules (n=1; n=2; n=3 and n=4), according to an embodiment, one single rule may be used, two rules may be used or more than 3 may be used such as 4, 5, 6 or more.

As illustrated for the first four columns of matrix F(4, 3), representing, for example, a section n=1, each column may be sub-divided into three subsets $58_1$, $58_5$ and $58_9$, $58_2$, $58_6$ and $58_{10}$ and so on, wherein each of the subsets $58_1$ to $58_{16}$ comprises one resource element only.

The next four columns representing, for example, section n=2, may be formed into subsets $58_{17}$ to $58_{20}$, comprising two resource elements each, wherein one or more resources $52_9$ to $52_{12}$ may be unassociated to the subsets of section n=2.

Columns 9 to 16 belonging to sections n=3 and n=4 of matrix F(4, 3) may be included completely into one subset $58_{21}$ to $58_{28}$ respectively. Usage of subsets $58_1$ to $58_{16}$, $58_{17}$ to $58_{20}$, $58_{21}$ to $58_{24}$ and $58_{25}$ to $58_{28}$ within each section n=1, n=2, n=3 and n=4 allow for an orthogonal access within the respective set of subsets. Subsets of different lengths are, by definition, also orthogonal with respect to subsets of different lengths (different number of resources used). Thus, the configuration according to FIG. 16c, shows a derivation of 28 subsets for serving 28 user equipment, data streams or communication streams, wherein each subset provide for a different throughput as indicated by the number of resource elements used.

Especially when referring to new radio, each resource element may comprise a same or different communication capability such as a bandwidth or a number of symbols to be transmitted within the resource element.

Both, matrices F(3,2) and F(4,3) show a comparable structure according to which:

The number of ones (allocated resources) in each row in the matrix F is n;

the number of ones (allocated resources) in each column of F is k;

the overlap between the columns of F is at most 1 (i.e., the user/layer signatures overlap at most in one position); and the overloading factor is $\beta=n/k$.

According to embodiments, the Euler square mapping is performed or executed such that n and k are in accordance with the explanations given in in connection with the generation of Euler squares. For example, for F(3,2) the rule applies according to which "p, p−1" is selected for p=3. For example, for F(4,3) the rule applies according to which "$p^2$, $p^2-1$" is selected for p=2. According to further embodiment, different indices may be selected. For example, an option is to select index n, k suh that $n=2^r p_1^{r_1} p_2^{r_2} \ldots p_l^{r_l}$ for-distinct odd primes $p_1, p_2, \ldots p_l$. Here, $k+1=\min\{2^r p_1^{r_1} p_2^{r_2} \ldots p_l^{r_l}\}$.

When referring now to FIGS. 7a and 7b, there is schematically illustrated the flexibility of using Euler-squares according to embodiments described herein. By way of example, 24 resources $52_1$ to $52_{24}$ may be used in the network, e.g., the network 100 or 150.

So as to allow an overload in the network, i.e., more users, layers, messages, or data streams when compared to the number of resources, Euler-squares may be used. According to FIG. 17a, a first matrix $F_1(4, 3)$ and a second matrix $F_2(4, 3)$ are used for generating subsets $58_1$ to $58_{16}$, $58_{17}$ to $58_{33}$ respectively, whilst allocating or associating resources $52_1$ to $52_{12}$, $52_{13}$ to $52_{24}$ respectively to the subsets $58_1$ to $58_{33}$. Thus, a double number of resources is allocated to a double number of subsets when compared to FIG. 16b. This allows for obtaining a number of 32 subsets so as to serve 32 users, layers or the like. As described in connection with FIG. 16c, a different number may be obtained.

Figure 17A:
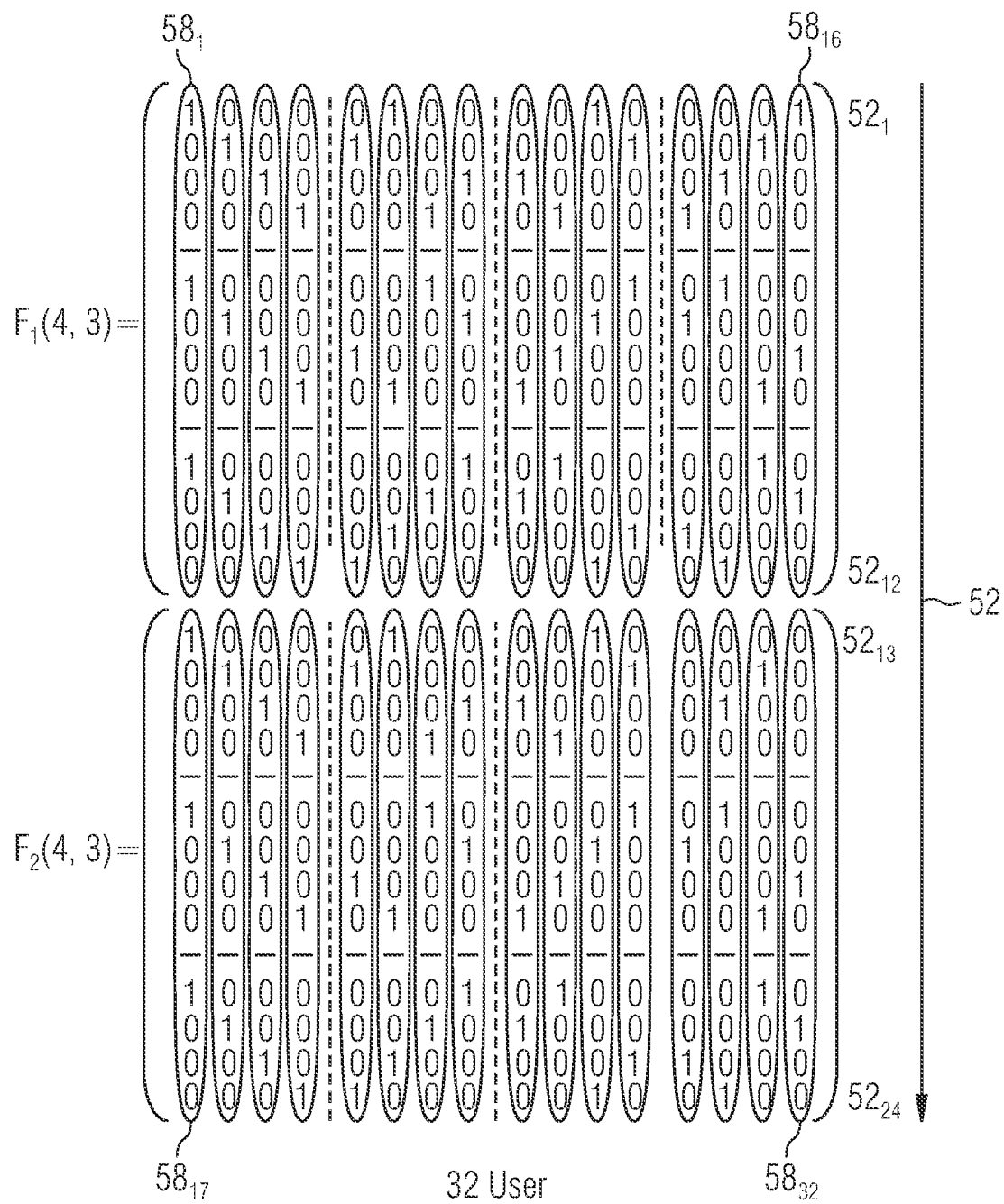
FIG. 17a shows a concept according to which a first matrix and a second matrix are used for generating subsets, according to an embodiment.
Figure 17B:
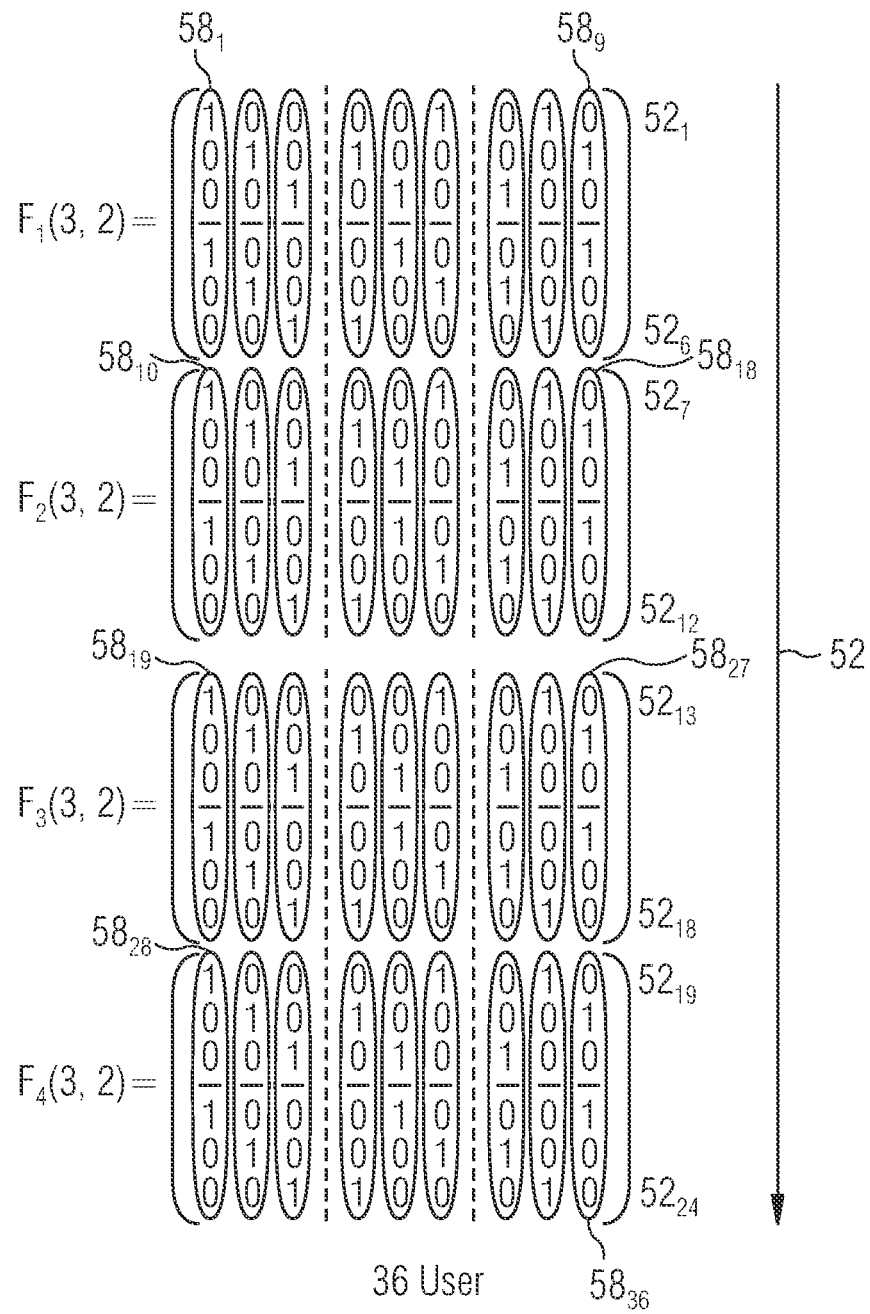
FIG. 17b shows a concept according to which four matrices are used so as to allocate or associate the same resources as in FIG. 7a to a different number of subsets, according to an embodiment.

In FIG. 17b four matrices $F_1(3, 2)$, $F_2(3, 2)$, $F_3(3, 2)$ and $F_4(3, 2)$ are used so as to allocate or associate the same resources $52_1$ to $52_{24}$ to a number of 36 subsets as each of the matrices $F_1(3, 2)$ to $F_4(3, 2)$ yields in a number of nine subsets as described in connection with FIG. 16a.

Applying the four matrices $F_1(3, 2)$ to $F_4(3, 2)$ to the resources $52_1$ to $52_{24}$ allows thus for obtaining a number of 36 subsets so as to serve a number of 36 users, layers or the like. Thus, when compared to FIG. 17a, a higher number of subsets may be obtained so as to serve a higher number of users by utilizing a same number of resources 52.

Using Euler-square matrices allows for a high flexibility. Based on a load in the network, an overload respectively, the allocation of resources 52 to the subsets 58 may be changed, varied or adapted so as to allow of the users to be served whilst, at the same time, allowing for a high communication quality due to the high spreading. This enables a reliable communication in the network.

In other words, FIGS. 7a and 7b illustrate two different configurations for a group of 24 resource elements. Both configurations use NOMA whereas both configurations have different spreading properties (configuration according to FIG. 17a has larger spreading width and has higher diversity gain, whereas configuration according to FIG. 17b supports a larger number of users.

Each part n=1, n=2, n=3 and/or n=4 may be subjected or associated with a different precoder ID. For example, each precoder may correspond to a beam former allowing for a hybrid configuration in conjunction with spatial precoding. Spatial multiplexing may lead to interference between different areas being multiplexed. By use of subsets being orthogonal with respect to other precoders, interference may be reduced between the different spatial regions.

Although embodiments described herein refer to Euler-square matrices of form F(3,2) and F(4,3) different forms may be used, for example, depending on the number of resources to be shared and/or on the number of subsets to be used. Although embodiments are described as using one single Euler-square-matrix (FIGS. 6a, 6b and 6c), two Euler-square matrices (FIG. 17a) or four Euler-square matrices (FIG. 17b) for allocating resources to subsets, according to embodiments, a different number such as 3, 5 or more may be used.

The controller may select the number of resources allocated to the subsets to be reduced. For example, the resources are typically allocated into different subsets, used otherwise or become unavailable for any reason.

This may be obtained by using a different Euler Square matrix for determining the subsets of resource elements, e.g., from the Euler-square matrix F(4,3) illustrated in FIG. 16b to the Euler-square matrix (F3,2) illustrated in FIG. 16a, or from the schedule of FIG. 17b to schedule of FIG. 17a. Alternatively, at the same time, the same number of users may be aimed to be mapped but on the lower number of resources, i.e., n·k' instead of on n·k resource elements or resource blocks.

Serving a same number of users using a reduced set of resources may be obtained as illustrated in FIG. 17c, in which the aforementioned knowledge may be exploited according to which the existence of the Euler Square of index n, k implies that the Euler Square of index n, k' also exists, wherein k'<k. Thus, effectively, a construction F(n, k') (where k'<k) exists, whenever a construction F(n, k) exists. In FIG. 17c this is illustrated for the Euler-square matrix F(4,3) of FIG. 17b being reduced to the Euler-square matrix F(4,2), i.e., k=3 and k'=2.

F(n, k') may be obtained from F(n, k) by simply deleting k-k' (3−2=1) blocks of n (n=4) rows each from F(n, k), for example, the last 4 rows such that instead of 12 resources 8 resources are mapped. Any other row or block thereof may be deleted. Reduction of the number of rows allows for maintaining the number of subsets 58 with reduced resources 52. A base station according to an embodiment may be configured for allocating the resources (first number thereof) to the second number of subsets during a first instance of time and for allocating a second, reduced number of resources to the same number of subsets during a second instance of time, wherein the first instance may be prior to the second instance or after. By reducing the number of resources, the benefits of the Euler-square concept, i.e., the relationship between the resource subsets may be maintained, in particular when deleting blocks of rows.

Figure 1B:
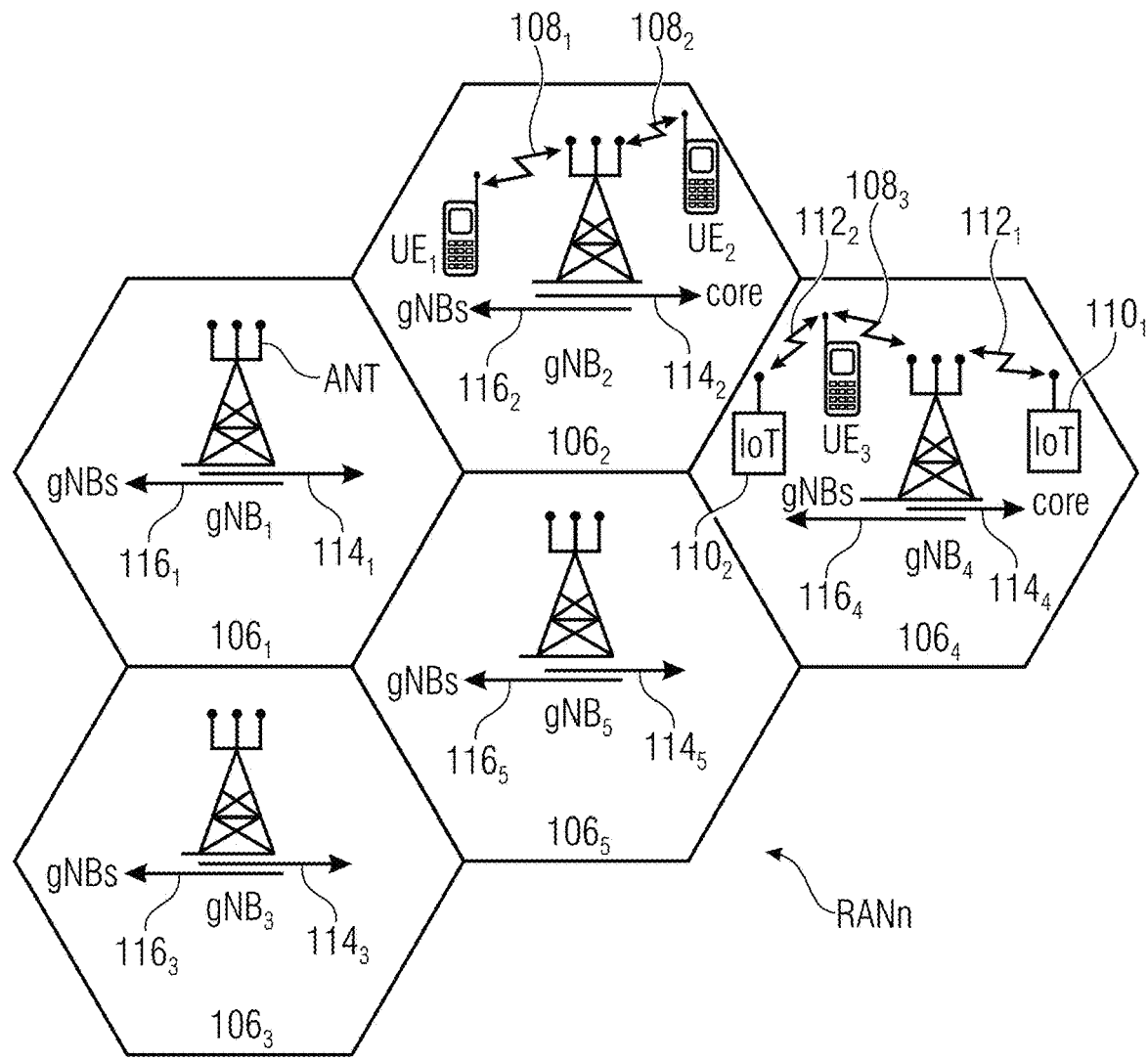
FIG. 1b is a schematic representation of an example of a radio access network.
Figure 18:
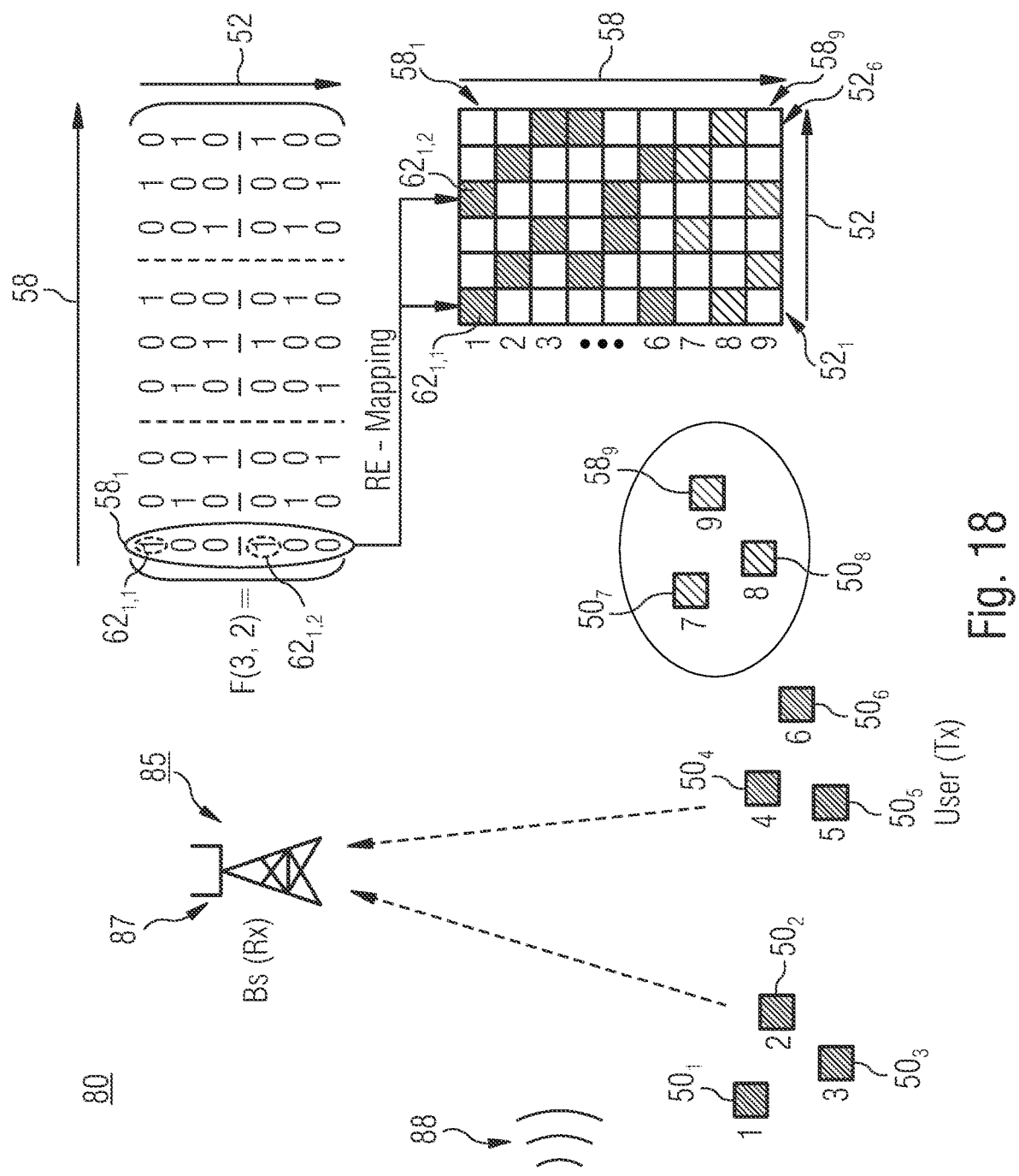
FIG. 18 shows a schematic block diagram of a wireless network according to an embodiment.

FIG. 18 shows a schematic block diagram of a wireless network 180 according to an embodiment. The wireless network 180 comprises a base station 85 according to an embodiment which may be in accordance with base station 44. The base station 85 is configured for operating at least a cell of a wireless network such that that the wireless network utilizes a first number of resources for serving communicating UEs $50_1$ to $50_9$. The base station 85 comprises a wireless interface 87 for communicating in the wireless network 180. The base station 85 may be, for example, one of the base stations gNB of FIG. 1 and/or one of the transceivers 156 and 158. The base station 85 is configured for operating the wireless network 180 so as to support communication of the UEs $50_1$ to $50_9$ by use of at least one subset $58_1$ to $58_9$ of the resources $52_1$ to $52_6$. The number of subsets 58 is larger when compared to the number of resources and is obtained based on a mapping of the number of resources 52 into the number of subsets 58 using an Euler-square mapping.

The base station 85 may be configured for dynamically adapting transmission properties. For example, whilst managing six resource elements $52_1$ to $52_6$, as long as at most six users, e.g., user equipments $50_1$ to $50_6$ or different user equipment are present in the wireless network cell, standard communication may be performed according to which each of the UEs $50_1$ to $50_6$ uses one associated or allocated resource.

At a situation in which one, more or all of additional UEs $50_7$ to $50_9$ become active in the wireless network 180, the base station may divide the resources $52_1$ to $52_6$ into the subsets $58_1$ to $58_9$ so as to serve all of the UEs $50_1$ to $50_9$. For example, if only one of the UEs $50_7$, $50_8$ or $50_9$ becomes active in the wireless network 180, the nine subsets may be generated whilst only seven of them are used. Accordingly, if two of the three additional UEs $50_7$ to $50_9$ become active, one of the subsets $58_1$ to $58_9$ may remain unused. The base station 85 may be configured for monitoring a number of communicating UEs served by the base station. The base station 85 may use orthogonal resources when the number of UEs is below a number threshold, for example, then number of resources available, wherein also different thresholds may be used, for example, if one or more resources are reserved for special purposes or the like. The base station 85 may further be configured for serving the UE so as to use the subsets when the number of UEs is at least the number threshold or above the threshold. I.e., when used, the base station 85 may switch from orthogonal communication to non-orthogonal communication.

Alternatively or in addition, the base station 85 may, whilst monitoring the number of communicating UEs served by the base station 85, determine, that the number of subsets is probably insufficient. For example, when referring to the examples given in connection with FIGS. 7a and 7b, starting from the example, in FIG. 17a, a $33^{rd}$ user may become active in the wireless network. The base station may be configured for adapting the number of subsets 58 in view of a count thereof and/or in view of a number of resources contained in the subsets as described in connection with FIG. 16c so as to obtain a second version of the second plurality of subsets 58, i.e., a higher number thereof. In different terms, the base station 85 may adapt this scheme according to which the resources are allocated into the subsets based on the number of UEs to be served. When the number of UEs decreases, the base station 85 may be configured for reducing the number of subsets, probably whilst increasing a number of resources used within each subset 85.

Whilst the examples given herein refer to the uplink, i.e., resources used by the UEs for transmitting their signals, data streams or messages, a same or comparable scheme may be used for the downlink purpose in which the base station uses different resources to communicate with the UEs. One or more of the UEs $50_1$ to $50_9$ may be configured for receiving a signal 88 containing a selection information. For example, the signal 88 may be transmitted from the base station 85 or from a different network controller, for example, of a controller of the core network 102 illustrated in FIG. 1.

The signal 88 may be transmitter wirelessly, wherein the selection information contained therein may indicate the allocated set of resources or a property thereof such as a bandwidth in terms of subband, size and indices. In particular, the allocated set of resources subjected to the overload may itself be a portion of the overall resources allocated by the base station. Further, the selection information may indicate a number, structure or further details of the subsets 58. For example, the selection information may indicate a subset, i.e., parts, of the group of subsets $58_1$ to $58_9$ generated by the base station 85.

For example, the selection information may indicate a preselection indicating that the receiving or addressed UE $50_1$ to $50_9$ is requested to select its subset out of the indicated preselection. I.e., the selection information may indicate a range of subsets to be used for communication for a grant-free access. For example, an identifier of the subsets may be transmitted.

The selection information may reduce the allowed range of subsets so far that specific subsets to be used may be indicated, for example, when the selection information only contains information about one single subset. This may be referred to as a grant-based access scheduled by the controller or base station. The selection information may indicate a specific subset, e.g., by using its identifier, allocated to the UE for a grant-based access. I.e., the selection information may allow for a schedule of the subsets.

Different UEs $50_1$ to $50_9$ may receive different selection information allowing to reduce a probability of a collision, in particular, in a configuration according to which the UE $50_1$ to $50_9$ is configured to use or utilize one or more subsets $58_1$ to $58_9$ in a grant-free manner. I.e., the selection information may be transmitted by the controller/base station UE-specific, group based for a group of UEs and/or network-based such as based on a cell-id of the wireless network cell.

Based on the base station transmitting the information on the specific channels, the UE may be configured for receiving the selection information indicating the allocated first set of resources, indicating the assignment of the specific Euler square matrix (F(n, k)) and/or the indicating the range of subsets to be used for communication over a broadcast control channel such as a Physical Broadcast Channel (PBCH) or the like, i.e., the controller may transmit the signal 88 using such a channel, wherein other channels may also be used. The UE may alternatively or in addition be configured for receiving the selection information indicating the specific subset allocated to the UE over a user specific channel such as a Physical Downlink Control Channel (PDCCH), wherein other channels may also be used.

Alternatively, an absence of the signal 88 may also be understood as a selection information, for when a UE of the UE $50_1$ to $50_9$ is aware of the present configuration or setting of the subsets 58, it may select a highly useful number thereof in a grant-free manner. Whilst not being restricted due to reception of the selection information with the signal 88, the UE may select the subset unrestrictedly. This does not exclude that the selection information may include a kind of codebook entry indicating the subset to be used and/or the scheme according to which the subset is obtained, for example, an index of the subset and the parameters n, k used in the matrix F. For example, the selection information may indicated an assignment of a specific Euler square matrix (F(n, k)) to be applied to the first set of resources for example by identifying the resources with a subband index. It is noted that the embodiments described herein are not limited to the specific embodiment of the matrix F(n, k). In contrast, different ways of generating an Euler-square matrix as described herein, may be used.

When the base station 85 has changed the scheme according to which the subsets are generated, the UE may also select a different subset such that the controller 56 is configured for selecting the at least one subset from a first version (e.g., F(3,2)) of the predefined subsets 58 during a first instance of time and from a second version (e.g., F(4,3)) of the predefined subsets during a second instance of time, wherein the first version and the second version differ in view of a count of the second number of predefined subsets and/or in view of a number of resources contained in the subset.

In other words, a particular application scenario is illustrated in FIG. 18, where multiple users share the same resources by using sparse spreading signatures/codes. In contrast to LDS/SCMA the mapping of the individual users to the specific resources may be determined by the F-matrix as described herein, for example, in connection with FIGS. 6a, 6b, 6c, 7a and/or 7b. FIG. 18 thus shows a non-orthogonal multiple access scenario using sparse signatures. All users 50 may be multiplexed over six resources and the signatures are constructed as described herein. The basestation only needs to broadcast the parameter of the F-matrix (n=3 and k=2) to the user. Together with an individual ID, each user can generate a unique spreading sequence, taking the corresponding row of the F-matrix.

A method for operating a UE according to an embodiment comprises communicating in the wireless network and selecting, for communicating in the wireless network, from a second number of predefined subsets of the first number of resources, at least one subset. The second number is larger than the first number. The second number of predefined subsets is based on a mapping of the first number of resources into the second number of subsets using an Euler-square mapping.

A method for operating a base station according to an embodiment comprises communicating in the wireless network with the base station. The method comprises operating the wireless network so as to support communication of the UEs by use of at least one subset from a second number of predefined subsets of the first number of resources. The second number is larger than the first number and the second number of predefined subsets is based on a mapping of the first number of resources into a second number of subsets using a Euler-square mapping.

Further embodiments refer to a computer program product comprising instructions, which when the program is executed by a computer, cause the computer to carry out one of the embodiments described herein.

The structure according to which the resource elements are allocated to subsets may be determined by a central controller of the network, e.g., a base station, wherein the base station may use a static or variable scheme. The system (base station) may determine or define, which sequences/subsets are allowed, for example, by defining the specific matrix or matrices to be used for deriving the subsets, which includes the possibility to reserve or block some subsets for special purposes such as priority services or the like. Thereby, the structure of the one or more F-matrices may be defined. Those F-matrices form a rule or a provision according to which users (layers) are allowed to access the underlying resource grid, the resources or resource blocks respectively. Some of those resources may be generated and/or used as orthogonal as will be describe in connection with FIG. 16c and FIGS. 19a and 19b.

A further aspect of the embodiments described herein is to allocated or associated different subsets to different precoders as described in connection with FIG. 16c. For example a specific number, e.g., 4 in FIG. 6c or a different number of 1, 2, 3 or more than 5 in other embodiments, are associated with a number of exemplarily four precoders or a different number of 1, 2, 3 or more than 5 in other embodiments, wherein the numbers of precoders and the number of subsets may correspond to each other but may also be different. Within one precoder, the subsets as illustrated in FIG. 16c are orthogonal with respect to each other, thereby allowing for an orthogonal communication, although the entirety of subsets may be non-orthogonal.

FIG. 19a shows a schematic illustration of a scenario in which, of example, six resources operated by the base station are mapped using an Euler-square mapping. FIG. 19b shows a schematic representation of the same scenario, wherein according to FIG. 19a an orthogonal communication is used, wherein, according to FIG. 19b, also non-orthogonal communication is allowed. For both, the orthogonal communication according to FIG. 19a and the non-orthogonal communication according to 9b, the Euler-square mapping according to embodiments may be used. During an example first instance of time $[t_1; t_2]$ a scenario of three users may be served by the first three subsets of the matrix F(3, 2) being linearly independent from each other and therefore allow for an orthogonal communication. In a different instance of time $[t_3; t_4]$ which may be prior or after the first instance of time, a number of up to six users may be supported by splitting the subsets $58_1$ to $58_3$ of the first time instance to subsets $58_1$ to $58_6$, each subset comprising one single resource element indicated by the single "1" in each subset 58.

During a different instance of time $[t_5; t_6]$ which may be prior or after the first and/or second instance of time, e.g., nine users are active in the network. Serving nine users with six resource elements at the same time by orthogonally serving them without amending the resource elements may be difficult or impossible.

When referring now to FIG. 19b, during the second instance of time, additional three subsets may be activated so as to serve the additional three users. Although being marked as inactive during the first instance of time, each user may use two or more subsets without any limitation.

During the third instance of time, all nine subsets $58_1$ to $58_9$ may be used by the nine users. In other words, embodiments describe a structured code design for NOMA with several attractive properties lending itself for practical implementation, in particular:

- It describes a code construction yielding regular layer/user-resource mapping based on Euler squares, where each layer occupies a fixed number of resources, and each resource is used by a fixed number of layers. The construction is flexible in the sense that it can be explicitly described for a wide number of combinations of system parameters, i.e. number of users/layers, number of resource elements, the number of resources occupied by each layer, the number of layers sharing the same resource and the overloading factor;
- The construction allows to trade QoS requirements such as latency, reliability and spectral efficiency in a flexible manner, making it appropriate for both unscheduled transmissions targeting mMTC scenarios, as well as scheduled transmission targeting eMBB and URLLC scenarios.
- The sparse regular construction gives signatures with small density, which support decoding algorithms with low computational complexity;
- There are significant savings in storage requirements as the generation of the code signatures involves only the storage of cyclic permutations (more details provided in the following description);
- The construction can be combined with other code-domain NOMA, both with sparse spreading (such as SCMA and LDS), and dense spreading;
- The construction naturally incorporates user transmission with random activation, making it also amenable for a use as a grant-free scheme for non-orthogonal random access.

When compared to known concepts, embodiments facilitate the application of NOMA in a wireless communication network by proving an effective method/concept to construct and distribute (sparse) resource allocation patterns (sequences/structured codes).

In other words, FIGS. 9a and 9b show an example resource allocation and adaptive network configuration.

This invention facilitates the application of NOMA in a wireless communication network by providing an effective method to construct and distribute (sparse) resource allocation pattern (sequences/structured codes). The core idea is that the resource allocation can be constructed based on specific rules—and only a set of parameters need to be signaled between different nodes in the network. In contrast, LDS/SCMA—based schemes employing sparse spreading as well—but make use of a pre-defined "codebook" (i.e. a pre-defined set of sequences, common to all nodes within the network). If two nodes want to communicate, both nodes (sender and receiver) need to share the indices of the specific sequence(s) to be used. Due to the limited dimension (size) of the codebooks and it's predefined structure it is not possible to adaptively switch between different configurations (e.g. overload factors).

Example of an SCMA network uses a codebook which allows 6 users to share the same 4 resources at the same time (which gives an overload factor of 6/4→1.5). There are 6 users in the network, each having an unique sequence id (i.e. codebook entry). Now, the number of users increases, i.e. there are two users joining the network but spare resource are unavailable. Thus it involves a new codebook which allows e.g., an overload of 8/4→2) and this new codebook need to be shared between all users (including the 6 other users). This results in signaling overhead. Our invention provides a framework how these sequences can be constructed more flexible, not a codebook entry is shared but a construction method of the sequence, which can be extended due to the regular structure of the construction.

Embodiments provide for a structured, flexible code design for NOMA, based on a regular layer/user resource mapping, and supporting a wide number of combinations of system parameters. In particular, in connection with the resource element, the following system model may be considered. It may be assumed that a general form of a resource grid where resource elements (i.e., channel users) are spread in time (OFDM symbols), frequency (subcarrier) and space (antennas, different beams thereof respectively) as shown in FIG. 20 illustrating an example diagram for illustrating the concept of a resource according to embodiments.

Figure 20:
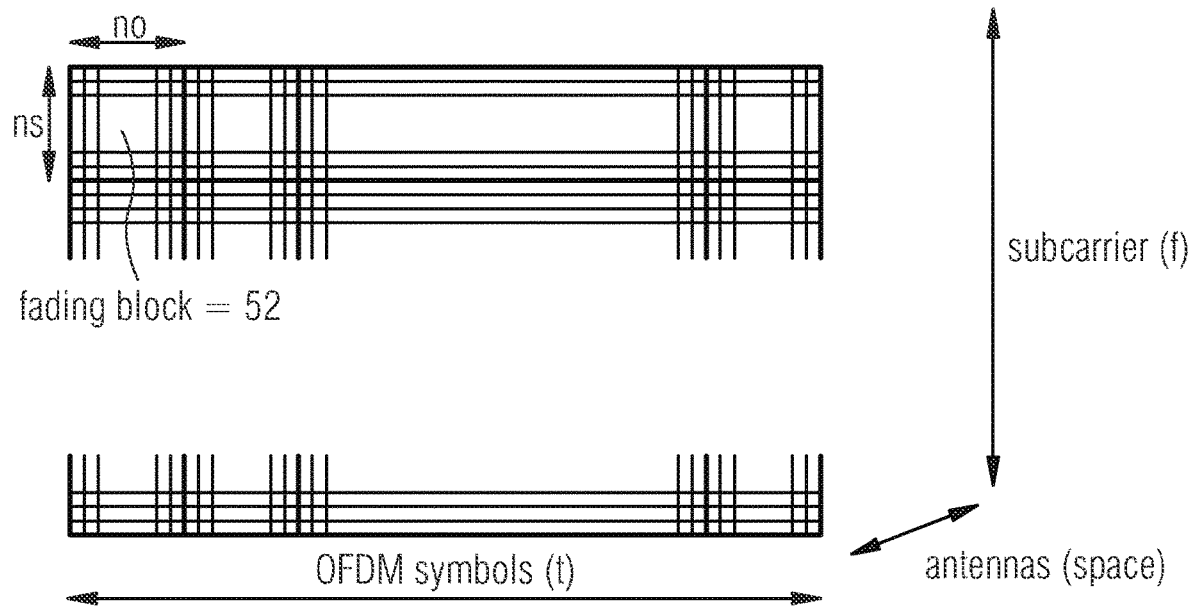
FIG. 20 shows an example diagram for illustrating the concept of a resource according to an embodiment.

A general form of a resource grid may be assumed where resource elements (i.e. channel uses) are spread in time, frequency and space (see FIG. 20). The resource elements are organized in fading blocks of length nc (coherence length) across which they are assumed to experience approximately the same (or similar) wireless channel conditions (i.e. realizations). For a frequency-flat narrowband channel, nc is the number of channel uses in time over which the channel stays constant (coherence time); for a frequency-selective channel and under the assumption that orthogonal frequency division multiplexing (OFDM) is used, nc is the number of subcarriers over which the channel stays constant (coherence bandwidth). More generally, nc can be interpreted as the number of time-frequency slots over which the channel does not change. The fading blocks are further divided in resource blocks (RBs) as, e.g. in an OFDM-based system, where a RB consists of no OFDM symbols, each one spanning ns consecutive subcarriers.

FIG. 20 thus shows an orthogonal resource frame—including fading blocks (FB), wherein each FB contains nc=ns·no resource elements (RE). As described previously, based on a possible flexible granulation of the wireless network, the term resource element in connection with the embodiments described herein may be flexible. According to an embodiment, a fading block is equal to a resource element 52. In an example scenario, the layers share the resource elements across a set of orthogonal resource blocks Q (a resource frame), in a non-orthogonal fashion. Thereby, it is assumed that each RB is a subset of a FB, i.e., that all resource elements within one RB experience (approximately) the same channel conditions, while the channel conditions may, in general, vary across different RBs. In addition, it may be assumed that a layer could be a user in the uplink of a communication channel, or a multiplexed signal in the downlink. In general, individual users are allowed to multiplex signal on the same resource elements, i.e., to use several layers simultaneously. In this context, different antenna-dimensions may additionally be considered as resource (space). A resource frame consisting of n FB orthogonal fading blocks (FBs), e.g., as in OFDM based systems, is dedicated for the multiple access procedure, i.e., are shared between the layers. A layer may be a user in the uplink of a communication channel, or a multiplexed signal in the downlink. In general, individual users may be allowed to multiplex signals on the same resource elements, i.e., to use several layers simultaneously.

In the context of the time-frequency grid illustrated in FIG. 20, the transmit signals of the individual users (layers) may be encoded for non-orthogonal transmission in the following way.

When active, user (layer) j divides the transmit signal vector $x_j$ in Q subvectors, where the q-th subvector $x_j^q$ is mapped on the resources in FB q. Without loss of generality, one can assume that the block lengths are of equal length nc (the size of the fading blocks). Due to the time-frequency symmetry within the fading block, different rearrangements are possible. As a special case, the construction where each active user (layer) transmits over exactly one subcarrier within each FB may be highlighted. In that case, the received signal matrix Y(q) over the fading block q reads $$Y^{(q)} = F^{(q)} \text{diag}(\lambda) \text{diag}(h^{(q)}) X^{(q)} + W^{(q)}, q=1, \ldots, Q$$

where, in this particular case, the j-th row of $X^{(q)}$ is the subvector $x_j^q$ which is transmitted over the no time slots (e.g. OFDM symbols). The construction from the Euler square of index n; k, as described is particularly appropriate, with the parameters being Q=k and ns=n and J=n2. For the matrix in the example provided in FIG. 16a and FIG. 16b this would mean that J=9 users (layers) are multiplexed over Q=2 fading blocks, where the fading block spans over ns=3 subcarriers and no time slots. Alternatively, embodiments may also be implemented so as to define ns being divided in 3 blocks of adjacent subcarriers.

As described before, the proposed method allows to assign individual UEs to access specific resources in a coordinated fashion. An example on how the network can change the configuration is given in the following. Assuming a wireless communication system where multiple users share the wireless resources (time, frequency, space). In an OFDMA-based system, the available resources are divided into (orthogonal) RBs (resource blocks), whereas each RB comprises several resource elements. In an LTE-based system, the number of supported user is limited by the number of the smallest resource instance which can be scheduled (in LTE this corresponds to the RB). If the number of users increase (exceeding the number of available orthogonal resources), the network/base-station can "switch" to orthogonal MA (NOMA) In order to allow higher number of users. A NOMA transmission can exploit sparse-spreading sequences to transmit the data, e.g. LDS/SCMA. Generally, the group resources which are shared by the same users can be considered as group or block. An example is depicted in FIG. 19a and FIG. 19b, where a group of 6 resources are shared 3/6/9 users with different MA strategies.

The overall performance of NOMA in general, and signature-domain NOMA in particular, should be addressed in conjuncture with appropriate forward error correction (FEC) coding (channel coding) and interleaving. The signature-based multiplexing may be treated as independent from the particular FEC scheme. There are, however, some system design issues arising from the system/channel model that should be addressed when implementing signature-domain multiplexing in conjuncture with FEC. In particular, two important system design parameters are to be addressed The number of diversity branches L over which the transmit signals are spread: in single-antenna transmissions this is basically the number of fading blocks, L=Q. The assumption here is that the different resource blocks experience more or less independent channel conditions. In the multiple antenna setup with sufficiently spaced antennas this is the number of resource blocks Q multiplied with the number of transmit antennas $n_t$, $L=Qn_t$;

The channel coherence length nc: this is the number of resource elements over which the channel remains (approximately) the same. When resource elements are grouped in resource blocks (as in our example), the size of the resource block does not exceed the coherence length, $n_{RE} = \text{ns} \cdot \text{nc}$.

There are different ways in which one can combine signature-domain NOMA with FEC, depending on the system design parameters, and the targeted communication requirements in terms of number of users to be accommodated over the shared resources, the respective transmission rates, reliability (block-error rates) and latency requirements. For example, one way to take advantage of diversity is to use a form of repetition over the available diversity branches, as e.g. in some Low Density Signature (LDS)-based NOMA schemes. An alternative (somewhat different in spirit) are the constructions based on high-dimensional constellations, as e.g. in SCMA, which are based on signal-space diversity concepts. The question is, however, if similar benefits may be gained by simply transmitting different portions of the coded block over different diversity branches. In practice this would mean that information bits are coded and interleaved, and then the first chunk of the coded block is transmitted on the first diversity branch (resource block), the second one on the second diversity branch and so on. Given a certain mobility scenario, and for a fixed code-length, the performance of each of the approaches depends critically on the number of diversity branches. In addition, when targeting a massive access scenario with (sporadic) short packet transmissions, i.e. a fixed short code-length, the number of diversity branches are traded with the number of symbols sent over the same fading block for optimal performance. The reason for this is that, when keeping the code-length fixed, by employing more diversity branches, less resource elements experiencing the same channel conditions are left for data transmission (including channel estimation) effectively deteriorating the performance.

When performing receiver configurations, the matrix F which maps the transmit signals to the shared resource elements, give raise to a bipartite graph, where resource node i and layer node j are connected if and only if $(F)_{i,j}=1$. Joint decoding based on MPA. The sparse regular construction give matrices with small density which support decoding algorithms with computational complexity. Due to the generic nature of the embodiments described herein, the embodiments may be configured to multiple different NOMA schemes, by appropriately selecting the respective parameter for generating the matrix F. There may be significant savings in storage requirements as the generation of an Euler square of an index p; p−1, for example, only involves storing two cyclic permutations of length p and p−1, respectively. For Euler square with index respectively and for Euler square of index p'; p'−1 (where p is a non-even prime) it is sufficient to store at most $p^2/2$ permutations. Embodiments provide for the numerous benefits and/advantages, including:

a promising multiple access and random access technology for a 5G standard;

a method to improve the throughput of a wireless network and enable operation in UL, DL, D2D, or M2M transmissions;

a method to transmit short packets with a small overhead;

a method to accommodate a large number of system devices;

a method to decrease latency in a random access scenarios;

a method to provide non-coherent data transmission (i.e. without instantaneous transmit/receive channel knowledge);

a low-complexity receiver implementation based on message passing;

an EXIT chart-based evaluation methodology.

Advantages derived from this disclosure may be significant due to the large amount of base stations and terminals in the network Embodiments may be used in applications of all kinds of wireless networks, such as current and upcoming network specifications, where signals are multiplexed on shared resources. Embodiments thus refer, in general, to signature domain multiple access.

The embodiments described herein allow for a flexible and scalable structuring of signatures according to which users spread their information. As described in connection with FIGS. 6a, 6b, 6c, 7a and 7b, same sequences and a same scheme for generating the same may be used for different situations such that embodiments described herein refer to the signature design as well as to the flexibility.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 21:
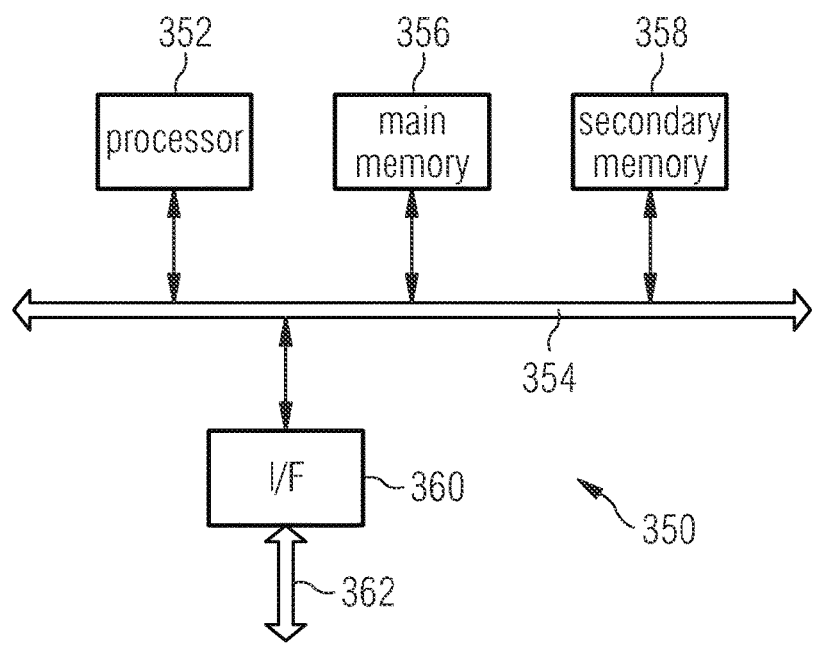
FIG. 21 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 21 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

In the following, additional embodiments and aspects of the invention will be described which can be used individually or in combination with any of the features and functionalities and details described herein.

1. Device for communicating in a wireless communication network to transmit transmission information, by transmitting a wireless signal in a Random Access Channel of the wireless communication network, the device comprising:
    a wireless interface configured for transmitting the wireless signal;
    a control unit configured for providing the wireless signal so as to comprise a random access preamble;

wherein the control unit is configured for selecting the random access preamble such that the random access preamble is associated with the transmission information.

2. The device of embodiment 1, wherein the transmission information is based on an at least one of the following:
    identifier of the device or
    arrival of a message
    pre-configuration of the network
    device class
    service class of the message
    priority class of the message
    reliability class of the message
    latency class of the message
    message type
    message content
    device priority
    service policy
    channel occupancy/quality measure.

3. The device of embodiment 1 or 2, wherein the control unit is configured for receiving, from an application of the device a Quality of Service (QoS) information related to the transmission information and for selecting the random access preamble based on the QoS information.

4. The device of one of previous embodiments, wherein the transmission information is related to data collected by the device or received by the device.

5. The device of one of previous embodiments, wherein the control unit is configured for receiving information indicating a preconfigured message to be transmitted with the wireless interface and for selecting the random access preamble so as to at least partially represent the preconfigured message.

6. The device of one of previous embodiments, wherein the control unit is configured for selecting the random access preamble based on the transmission information and from a set of random access preambles having at least one random access preamble, the set of random access preambles being a dedicated subset of random access preambles of the wireless communication network.

7. The device of embodiment 5, wherein the subset is one of a plurality of distinct subsets, each subset comprising at least one random access preamble; wherein each subset is associated with a subset identifier indicating a first information; wherein the random access preamble of a subset is associated with a second information.

8. The device of embodiment 7, wherein the plurality of subsets comprise preambles that are orthogonal between the sets.

9. The device of embodiment 7 or 8, wherein the first information is related to at least one of
    information indicating an identifier of the device;
    information indicating a device class of the device; and
    information indicating a service class of the transmission information;
    wherein the second information is related to at least one of
    information indicating the transmission information;
    information indicating a service class of the transmission information; and
    information indicating a reliability measure of the device/observation.

10. The device of one of previous embodiments, wherein the wireless signal is a first wireless signal related to the transmission information; wherein the random access preamble is a first random access preamble related to the transmission information; wherein the device is configured for transmitting a second wireless signal unrelated to the transmission information; wherein the device is configured for transmitting a second random access preamble so as to reserve for resources of the wireless communication network for subsequently transmitting the second wireless signal.

11. The device of one of previous embodiments, wherein the device is configured for using a resource of a set of predetermined resources dedicated for transmitting the wireless signal to a transmission of transmission information-related wireless signals.

12. The device of embodiment 10 or 11, wherein the control unit is configured for selecting the first random access preamble from a first set of random access preambles and for selecting the second random access preamble from a second, distinct set of random access preambles.

13. The device of one of previous embodiments, wherein the wireless signal is a first wireless signal; wherein the device is configured for transmitting a second wireless signal comprising further information related to the transmission information after having transmitted the first wireless signal.

14. The device of embodiment 3, wherein the device is configured for using a predetermined resource of the wireless network for transmitting the second wireless signal.

15. The device of embodiment 14, wherein the predetermined resource is dedicated to the device within the wireless communication network; or wherein the control unit is configured for selecting the predetermined resource from a pool of predetermined resources.

16. The device of any of embodiments 13 to 15, wherein the device is configured for transmitting a contention resolution signal after transmitting the first wireless signal and prior to transmitting the second wireless signal.

17. The device of embodiment 16, wherein the device is configured for receiving scheduling information indicating a scheduled resource of the wireless communication network and for using the scheduled resource for transmitting the second wireless signal.

18. The device of one of previous embodiments, wherein the device is configured for transmitting the random access preamble as a first random access preamble so as to indicate a message class of the wireless signal or a group of devices to which the device belongs; and for seamlessly transmitting a second random access preamble for contention resolution.

19. The device of one of previous embodiments, wherein the wireless signal is a first wireless signal, wherein the device is configured for transmitting a second wireless signal subsequent to the first wireless signal for contention resolution;
wherein the device is configured for transmitting one of the first wireless signal and the second wireless signal synchronized with the base station and for transmitting the other wireless signal unsynchronized with the base station or with an individualized timing at the base station; or
wherein the device is configured for transmitting the first wireless signal and the second wireless signal unsynchronized with the base station or with an individualized timing at the base station.

20. The device of embodiment 19, wherein the device is configured for transmitting the first wireless signal and the second wireless signal with an individualized timing at the base station; wherein the individualized timing for the first wireless signal and the second wireless signal is same or different.

21. The device of embodiment 19 or 20, wherein the device is configured for choosing a time value for the individualized timing based on the transmission information or pre-configured.

22. Device for communicating in a wireless communication network by transmitting a wireless signal, the wireless communication network operated by a base station by use of a synchronization at the base station; the device comprising a wireless interface;
wherein the device is configured for transmitting, with the wireless interface, one of a first wireless signal and a second wireless signal synchronized with the base station and for transmitting the other wireless signal unsynchronized with the base station or with an individualized timing at the base station; or
wherein the device is configured for transmitting the first wireless signal and the second wireless signal unsynchronized with the base station or with an individualized timing at the base station;
wherein the first and/or second wireless signal is associated with contention resolution at the base station.

23. The device of one of previous embodiments, wherein the device is a narrowband Internet-of-Things device configured for transmitting the wireless signal in a narrowband physical random access channel.

24. Base station for operating a wireless communication network so as to provide for a random access resource to be used by a device for a random access procedure for transmitting a wireless signal having a random access preamble of a plurality of random access preambles;
wherein the base station is configured for associating a random access preamble received with a first wireless signal to a transmission information being reported by the device and for not associating a second random access preamble received with a second wireless signal with the transmission information.

25. The base station of embodiment 24, wherein the base station is configured to operate the wireless network communication network so as to allow communication between the base station and a first device and a second device,
wherein the base station is configured for associating a random access preamble transmitted by the first device with a first transmission information and for associating the random access preamble transmitted by the second device with a second, different transmission information.

26. The base station of embodiment 24 or 25, wherein the base station is configured for interpreting the random access preamble at least as part of payload data transmitted by the device.

27. The base station of any of embodiments 24 to 26, wherein the base station is configured for receiving the first wireless signal, for identifying the transmission information based on the random access preamble and for performing contention resolution after having identified the transmission information.

28. The base station of embodiment 27, wherein the random access preamble is associated with an identifier, wherein the base station is configured for performing the contention resolution based on a transmission of the identifier so as to initiate a random access procedure of devices having transmitted a wireless signal containing the random access preamble associated with the identifier.

29. The base station of any of embodiments 24 to 28, wherein the base station is configured for broadcasting information indicating an association of the transmission information with the random access preamble in a system information block of a communication scheme of the wireless communication network.

30. The base station of any of embodiments 24 to 29, wherein the base station is configured for evaluating the random access resource for a first random access preamble indicating a group of devices and for a second random access preamble indicating an identifier of the device.

31. Base station for operating a wireless communication network;
    wherein the base station is configured for operating the wireless communication network such that a device communicating in the wireless communication network compensates for a timing offset based on a channel delay so as to synchronize with the base station;
    wherein the base station is configured for controlling the device so as to transmit a wireless signal for contention resolution unsynchronized with the base station or with an individualized timing at the base station.

32. Wireless communication network comprising
    at least one base station according to one of embodiments 24 to 31; and
    at least one device according to one of embodiments 1 to 23.

33. Method for operating a device adapted for communicating in a wireless communication network to transmit information related to a transmission information at the device by transmitting a wireless signal in a Random Access Channel of the wireless communication network, the method comprising:
    selecting the random access preamble such that the random access preamble is associated with the transmission information;
    providing the wireless signal so as to comprise the random access preamble; and
    transmitting the wireless signal.

34. Method for operating a wireless device adapted for communicating in a wireless communication network by transmitting a wireless signal, the wireless communication network operated by a base station by use of a synchronization at the base station; the method comprising:
    transmitting, with a wireless interface, a first wireless signal synchronized with the base station;
    transmitting a second wireless signal associated with contention resolution at the base station unsynchronized with the base station or with an individualized timing at the base station.

35. Method for operating a base station adapted for operating a wireless communication network so as to provide for a random access resource to be used by a device for a random access procedure for transmitting a wireless signal having a random access preamble of a plurality of random access preambles; the method comprising:
    associating a random access preamble received with a first wireless signal to a transmission information being reported by the device; and
    not associating a second random access preamble received with a second wireless signal with the transmission information.

36. Method for operating a base station adapted for operating a wireless communication network; the method comprising:
    operating the wireless communication network such that a device communicating in the wireless communication network compensates for a timing offset based on a channel delay so as to synchronize with the base station; and
    controlling the device so as to transmit a wireless signal for contention resolution unsynchronized with the base station or with an individualized timing at the base station.

37. A computer readable digital storage medium having stored thereon a computer program having a program code for performing, when running on a computer, a method according to one of embodiments 33 to 36.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device comprising:
   an interface circuit, wherein the interface circuit is arranged to transmit a first signal;
   a processor circuit and a memory circuit, wherein the memory is arranged to store instructions for the processor circuit,
   wherein the processor circuit is arranged to provide the first signal so as to comprise a random access preamble,
   wherein the processor circuit is arranged to select the random access preamble such that the random access preamble is associated with a transmission information,
   wherein the processor circuit is arranged to transmit a second signal after transmitting the first signal,
   wherein the second signal comprises second information related to the transmission information,
   wherein the processor circuit is arranged to transmit a contention resolution signal between transmitting the first signal and transmitting the second signal.

2. The device of claim 1, wherein the transmission information is based on one of the group consisting of identifier of the device, arrival of a message, pre-configuration of the network, device class, service class of the message, priority class of the message, reliability class of the message, latency class of the message, message type, message content, device priority, service policy or channel occupancy/quality measure.

3. The device of claim 1,
   wherein the processor circuit is arranged to receive a Quality of Service information related to the transmission information,
   wherein the circuit is arranged to select the random access preamble based on the Quality of Service information.

4. The device of claim 3, wherein the processor circuit is arranged to use a predetermined resource for transmitting the second signal.

5. The device of claim 4, wherein the predetermined resource is dedicated to the device or the processor circuit is arranged to select the predetermined resource from a pool of predetermined resources.

6. The device of claim 1, wherein the transmission information is related to data obtained by the device.

7. The device of claim 1,
   wherein the processor circuit is arranged to receive information,
   wherein the information indicates a message,
   wherein the message is transmitted with the interface circuit,
   wherein the processor circuit selects the random access preamble so as to at least partially represent the message based on the information.

8. The device of claim 1,
   wherein the processor circuit is arranged to select the random access preamble based on the transmission information a plurality of random access preambles,
   wherein the plurality of random access preambles comprises at least one first random access preamble,
   wherein the plurality of random access preambles is a portion of random access preambles.

9. The device of claim 8,
   wherein the portion is one of a plurality of portions,
   wherein each portion of the plurality of portions comprise at least one random access preamble,
   wherein each portion of the plurality of portions is associated with a portion identifier,
   wherein the portion identifier indicates a first information,
   wherein the random access preamble of a portion is associated with a second information.

10. The device of claim 9, wherein the plurality of portions comprise preambles that are orthogonal.

11. The device of claim 9,
    wherein the first information is related to at least one of the group consisting of information indicating an identifier of the device, information indicating a device class of the device, and information indicating a service class of the transmission information,
    wherein the second information is related to at least one of the group consisting of information indicating the transmission information, information indicating a service class of the transmission information, and information indicating a reliability measure of the device/observation.

12. The device of claim 1,
    wherein the first signal is related to the transmission information,
    wherein the random access preamble is a first random access preamble related to the transmission information,
    wherein the processor circuit is arranged to transmit a second signal,
    wherein the second signal is unrelated to the transmission information,
    wherein the processor circuit is arranged to transmit a second random access preamble so as to reserve resources,
    wherein the resource are for transmitting the second signal.

13. The device of claim 12,
    wherein the processor circuit is arranged to select the first random access preamble from a first plurality of random access preambles,
    wherein the processor circuit is arranged to select the second random access preamble from a second plurality of random access preambles.

14. The device of claim 1, wherein the processor circuit is arranged to use a resource of a plurality of predetermined resources dedicated for transmitting the first signal to a transmission of transmission information-related signals.

15. The device of claim 1,
wherein the processor circuit is arranged to receive scheduling information,
wherein the scheduling information indicates a scheduled resource,
wherein the processor circuit is arranged to use the scheduled resource for transmitting the second signal.

16. The device of claim 1,
wherein the processor circuit is arranged to transmit the random access preamble as a first random access preamble so as to indicate a message class of the first signal,
wherein the processor circuit is arranged to transmit a second random access preamble,
wherein the second random access preamble is for contention resolution.

17. The device of claim 1,
wherein the processor circuit is arranged to a second signal subsequent to the first signal,
wherein the second signal is for contention resolution;
wherein a first transmission is one of the first signal and the second signal,
wherein a second transmission is one of the first signal and the second signal,
wherein the first transmission is different from the second transmission,
wherein the processor circuit is arranged to transmit the first transmission synchronized with a second device,
wherein the processor circuit is arranged to transmit the first wireless signal and the second wireless signal unsynchronized with the second device or with an individualized timing at the second device.

18. The device of claim 17,
wherein the processor circuit is arranged to transmit the first signal and the second signal with the individualized timing at the second device,
wherein the individualized timing for each of the first signal and the second signal is same.

19. The device of claim 17, wherein the processor circuit is arranged to choose a time value for the timing based on the transmission information or a pre-configured information.

20. The device of claim 17,
wherein the processor circuit is arranged to transmit the first signal and the second signal with the individualized timing at the second device,
wherein the individualized timing for each of the first signal and the second signal is different.

21. A device comprising:
a processor circuit and a memory circuit, wherein the memory is arranged to store instructions for the processor circuit,
wherein the processor circuit is arranged to provide a random access resource,
wherein the random access resource is used by a third device for a random access procedure for transmitting a first signal,
wherein the first signal comprises a first random access preamble of a plurality of random access preambles,
wherein the processor circuit is arranged to associate the first random access preamble received with a first signal to a transmission information,
wherein the transmission information is reported by the third device,
wherein the processor circuit is arranged to not associate a second random access preamble received with a second signal with the transmission information.

22. The device of claim 21,
wherein the processor circuit is arranged to allow communication between the device and a first device and a second device,
wherein the processor circuit is arranged to associate a random access preamble,
wherein the random access preamble is transmitted by the first device with a first transmission information,
wherein the processor circuit is arranged to associate the random access preamble transmitted by the second device with a second transmission information,
wherein the first transmission information is different from the second transmission information.

23. The device of claim 21, wherein the processor circuit is arranged to interpret the random access preamble at least as part of payload data transmitted by the device.

24. The device of claim 21,
wherein the processor circuit is arranged to receive the first signal,
wherein the processor circuit is arranged to identify the transmission information based on the random access preamble,
wherein the processor circuit is arranged to perform a contention resolution after having identified the transmission information.

25. The device of claim 24,
wherein the random access preamble is associated with an identifier,
wherein the processor circuit is arranged to perform the contention resolution based on a transmission of the identifier so as to initiate a random access procedure of devices having transmitted a first signal comprising the random access preamble associated with the identifier.

26. The device of claim 21, wherein the processor circuit is arranged to broadcast information indicating an association of the transmission information with the random access preamble in a system information block of a communication scheme.

27. The device of claim 21,
wherein the processor circuit is arranged to evaluate the random access resource for a first random access preamble indicating a group of devices,
wherein the processor circuit is arranged to evaluate a second random access preamble indicating an identifier of the third device.

* * * * *